United States Patent
Eda et al.

(10) Patent No.: US 7,333,255 B2
(45) Date of Patent: Feb. 19, 2008

(54) LASER PROCESSING DEVICE

(75) Inventors: Yukio Eda, Tokyo (JP); Sadashi Adachi, Tokyo (JP); Norio Kurita, Hamamatsu (JP); Tetsuya Osajima, Iwata (JP)

(73) Assignees: Olympus Corporation, Tokyo (JP); Hamamatsu Photonics K.K., Shizuoka-Ken (JP)

( * ) Notice: Subject to any disclaimer, the term of this patent is extended or adjusted under 35 U.S.C. 154(b) by 0 days.

(21) Appl. No.: 11/450,801

(22) Filed: Jun. 9, 2006

(65) Prior Publication Data

US 2006/0228095 A1    Oct. 12, 2006

Related U.S. Application Data

(63) Continuation of application No. PCT/JP2005/008003, filed on Apr. 27, 2005.

(30) Foreign Application Priority Data

Apr. 28, 2004   (JP)   ............ P2004-132995
Apr. 28, 2004   (JP)   ............ P2004-132997

(51) Int. Cl.
    *G02B 26/08*   (2006.01)
(52) U.S. Cl. ............ 359/196; 359/197
(58) Field of Classification Search ............ 359/196, 359/197
    See application file for complete search history.

(56) References Cited

U.S. PATENT DOCUMENTS 3,689,159 A    9/1972  Taniguchi et al.
5,272,552 A *  12/1993 Yoshinaga et al. ......... 349/183
5,637,244 A    6/1997  Erokhin
5,667,707 A    9/1997  Klingel et al.
6,087,617 A    7/2000  Troitski et al.
2005/0174424 A1* 8/2005 Kishima ............. 347/239
2006/0291039 A1* 12/2006 Eda et al. ............ 359/362

FOREIGN PATENT DOCUMENTS

| DE | 196 55 127 C2 | 1/1998 |
|---|---|---|
| EP | 0 680 805 A2 | 11/1995 |
| FR | 2.096.880 | 3/1972 |
| JP | 62-67689 | 4/1987 |
| JP | 04-327394 | 11/1992 |
| JP | 05-119263 | 5/1993 |
| JP | 2000-71088 | 3/2000 |
| JP | 2001-083428 | 3/2001 |
| JP | 2003-48091 | 2/2003 |
| JP | 2003-175497 | 6/2003 |

* cited by examiner

*Primary Examiner*—Jennifer Doan
(74) *Attorney, Agent, or Firm*—Scully, Scott, Murphy & Presser, P.C.

(57) ABSTRACT

A laser condensing optical system of the present invention includes a laser beam source which emits a laser beam, a condensing optical system which is arranged between the laser beam source and a medium and condenses the laser beam in the medium, and a laser divergence point moving unit which can move the position of a laser divergence point of the laser beam along an optical axis of the laser beam in accordance with the refractive index of the medium in which the laser beam is desired to be condensed and the distance from a surface of the medium to a position where the beam is desired to be condensed.

14 Claims, 18 Drawing Sheets

ENTRANCE PUPIL DIAMETER

LASER PROCESSING DEVICE

This application is a Continuation Application of International Patent Application No. PCT/JP2005/008003, filed on Apr. 27, 2005, which claims priority from Japanese Patent Application Nos. 2004-132995 and 2004-132997, the contents of which are incorporated herein by reference.

BACKGROUND OF THE INVENTION

1. Field of the Invention

The present invention relates to a laser condensing optical system and a laser processing device which condense a laser beam at different positions in a medium.

The present invention also relates to a laser processing device which can change the position of a beam source while maintaining constant intensity and intensity distribution of light which is incident on a pupil face of an optical system. The present invention particularly relates to an ideal laser processing device which can condense a laser beam at positions of different depths in a medium, or a laser processing device which is suitable for changing a condensing position.

2. Description of the Related Art

Currently, laser beams are used in various fields, and various types of devices using laser beams are being developed. One example is a processing device which uses a laser beam to cut a target for processing, such as a semiconductor wafer or glass. This processing device includes a condensing optical system which, by condensing a laser beam emitted from a laser beam source, generates a modifying layer or the like in a medium and thereby cuts it. When cutting, since targets for processing have various thicknesses, the laser beam is not always condensed at the same depth, and must be condensed at different thicknesses in accordance with the thickness of the target for processing. That is, there is a demand to condense at sections of different depths in a medium.

Various conventional techniques are used to condense light in sections of different thicknesses such as those mentioned above while correcting spherical aberration and suppressing change in the condensing performance.

For example, in one such technique, parallel plate glasses of different thicknesses are removably attached at the tip of a condensing optical system such as an objective lens.

There is also a conventional objective lens with a correction ring for microscope which successfully corrects aberration over an ultra-wide field, having a magnification of approximately 40-power and an NA (numerical aperture) of 0.93 (e.g. see Japanese Unexamined Patent Application, First Publication No. H05-119263 (FIG. 1 etc.)).

There is also an optical system which corrects spherical aberration by moving a spherical aberration correcting optical system of a no power lens in the optical axis direction (e.g. see Japanese Unexamined Patent Application, First Publication No. 2003-175497 (FIG. 1 etc.)).

Furthermore, FIG. 20 shows a microscope device in which spherical aberration is corrected by arranging a spherical aberration correcting lens 232 between an objective lens 230 and a light source 231, and moving the spherical aberration correcting lens 232 along the optical axis (e.g. see Japanese Unexamined Patent Application, First Publication No. 2001-83428 (FIG. 1 etc.)).

SUMMARY OF THE INVENTION

A laser condensing optical system of this invention includes a laser beam source which emits a laser beam, a condensing optical system which is arranged between the laser beam source and a medium and condenses the laser beam in the medium, and a laser divergence point moving unit which moves the position of a laser divergence point of the laser beam along an optical axis of the laser beam in accordance with the refractive index of the medium in which the laser beam is condensed and the distance from a surface of the medium to a position where the beam is condensed.

The laser divergence point moving unit may set the position of the laser divergence point based on wavefront data of the condensing optical system measured beforehand.

An observation optical system may be provided in coordination with the condensing optical system, and maintains a predetermined distance from a bottom face of the condensing optical system to the surface of the medium. This observation optical system may include an autofocus detecting unit or an autofocus mechanism.

The relative distance in the optical axis direction between the condensing optical system and the surface of the medium may be constant.

It is also acceptable to use a laser processing device which includes the condensing optical system.

A laser processing device according to a first aspect of this invention includes a laser beam source which emits a laser beam; a collimating unit which collimates rays of the laser beam emitted from the laser beam source to parallel rays; a condensing optical system which condenses the parallel rays of the laser beam in a medium; a first lens group which is arranged in the parallel rays between the collimating unit and the condensing optical system and moves along the optical axis direction of parallel rays, the first lens group including one or more lenses; a second lens group which is securely arranged in the parallel rays between the first lens group and the condensing optical system, and includes one or more lenses; and a moving unit which moves the first lens group in accordance with the refractive index of the medium in which the laser beam is desire to be condensed and the distance from a surface of the medium to a position where the laser beam is condensed. A rear side focal length of the second lens group is arranged at least in the vicinity of an entrance pupil position of the condensing optical system.

An observation optical system may be provided in coordination with the condensing optical system, and maintains a predetermined distance from a bottom face of the condensing optical system to the surface of the medium. This observation optical system may include an autofocus detecting unit or an autofocus mechanism.

The relative distance in the optical axis direction between the condensing optical system and the surface of the medium may be constant.

When |f| is the combined focal distance of the first lens group and the second lens group, the moving unit may move the first lens group to a position which satisfies the following equation.

$$1/|f| < 0.01$$

When f2 is the focal distance of the second lens group, the second lens group may satisfy the following equation.

$$f2 > 0$$

When f1 is the focal distance of the first lens group and f2 is the focal distance of the second lens group, the first lens group and the second lens group may satisfy the following equations.

$$f1<0$$

$$\text{and } 1 \leq |f1/f2| \leq 5$$

When f1 is the focal distance of the first lens group and f2 is the focal distance of the second lens group, the first lens group and the second lens group may satisfy the following equations.

$$f1>0$$

$$\text{and } 0.5 \leq |f1/f2| \leq 2$$

A laser processing device according to a second aspect of this invention includes a laser beam source which emits a laser beam; a condensing optical system which condenses the laser beam in a medium; and a laser condensing optical system wherein, in accordance with the refractive index of the medium where the laser beam is condensed and the distance from a surface of the medium to a position where the laser beam is condensed, a plurality of lenses satisfying the following equation are exclusively inserted/removed to/from a path of divergent rays and/or convergent rays of the condensing optical system.

$$2(d^2+l \times f - l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

A laser processing device according to a third aspect of this invention includes a laser beam source which emits laser rays parallel to an optical axis; an optical system which condenses the laser rays in a medium; and a laser condensing optical system wherein, in accordance with the refractive index of the medium where the laser beam is condensed and the distance from a surface of the medium to a position where the laser beam is condensed, a plurality of lenses satisfying the following equation are exclusively inserted/removed to/from the laser rays.

$$b(f-d)/f = a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

BRIEF DESCRIPTION OF THE REFERENCE SYMBOLS

Detailed Description of the Invention

A laser condensing optical system and a laser processing device according to a first embodiment of this invention will be explained with reference to FIGS. 1A to 1C and FIG. 2.

Figure 1A:
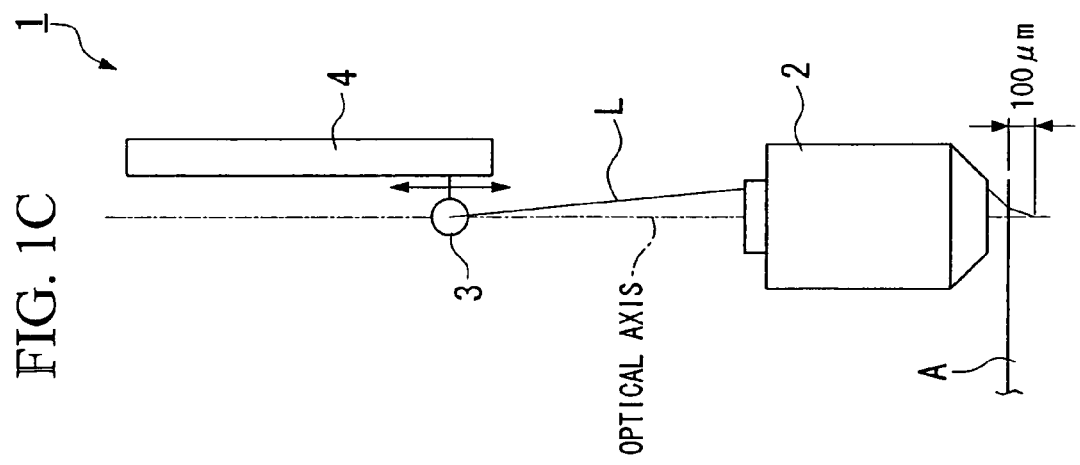
FIGS. 1A to 1C show diagrams of configurations of a laser processing device and a laser condensing optical system according to a first embodiment of this invention.
Figure 1B:
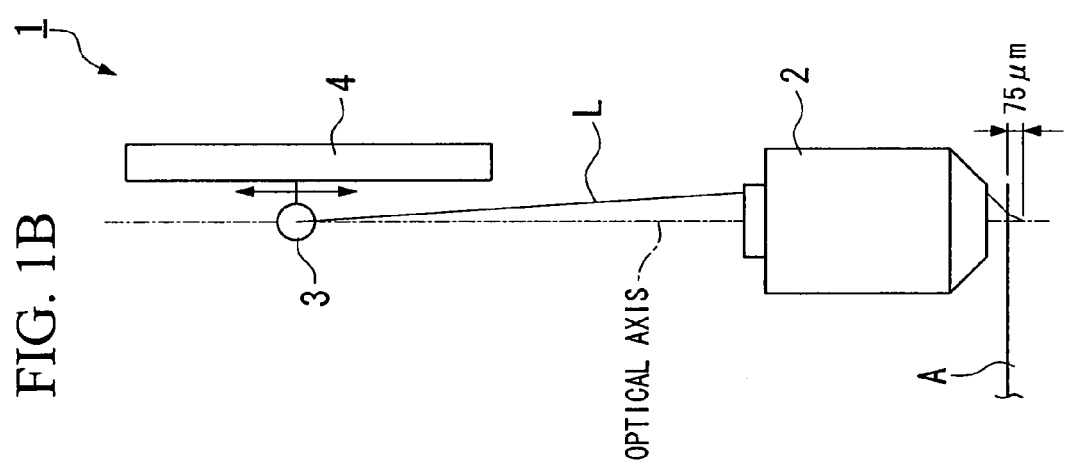
Figure 1C:
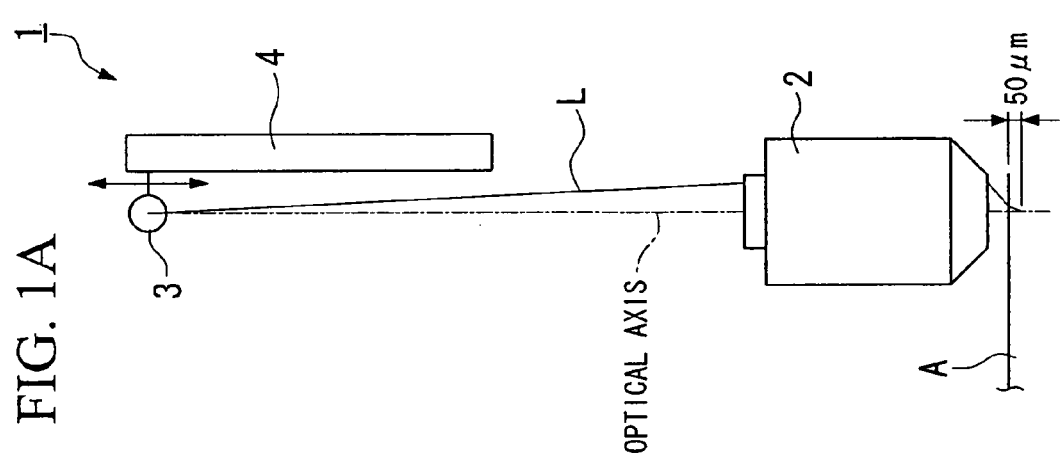

The laser processing device of this invention can horizontally scan a laser beam L in a condensed state in a wafer (medium) A while executing laser processing and cutting the wafer A to a given size, and includes a laser condensing optical system 1 shown in FIGS. 1A to 1C. The laser processing device of this embodiment also includes a stage (not shown) which can move the wafer A horizontally and vertically.

The laser condensing optical system 1 includes a laser beam source (not shown) which emits a laser beam L in a state of parallel rays, a condensing optical system 2 including an objective lens and the like which is arranged between the laser beam source and the wafer A and condenses the laser beam L in the wafer A, and a laser divergence point moving unit 4 which can move the position of a laser divergence point 3 of the laser beam L along the optical axis of the laser beam L in accordance with the desired refractive index for condensing the laser beam L and the distance from the surface of the wafer A to a desired condensing position.

In this embodiment, the laser divergence point 3 is the position where the parallel rays of the laser beam L emitted from the laser beam source are changed to divergent rays (non-parallel state) by a predetermined optical system. When the laser beam source is set such that it can emit the laser beam in a non-parallel state, the position of emission from the laser beam source is the laser divergence point 3.

The laser divergence point moving unit 4 is connected to a controller (not shown), and moves the laser divergence point 3 after receiving a signal from this controller. The controller includes an input unit which predetermined information can be input to, and a calculator which calculates the amount of movement of the laser divergence point 3 based on various information (input data) which is input to the input unit. In accordance with the calculated result, the controller sends a signal to the laser divergence point moving unit 4 and makes it move the laser divergence point 3.

In addition to controlling the laser divergence point moving unit 4, the controller simultaneously controls the laser beam source such that it emits the laser beam L after the laser divergence point 3 is moved.

An example in which the laser condensing optical system 1 configured as above is used to condense the laser beam L at different depths from the surface of the wafer A, and to cut the wafer A by scanning it, will be explained. In this embodiment, an example where the laser beam is condensed at positions at depths of, for example, 50 µm, 75 µm, and 100 µm from the surface will be explained.

Figure 2:
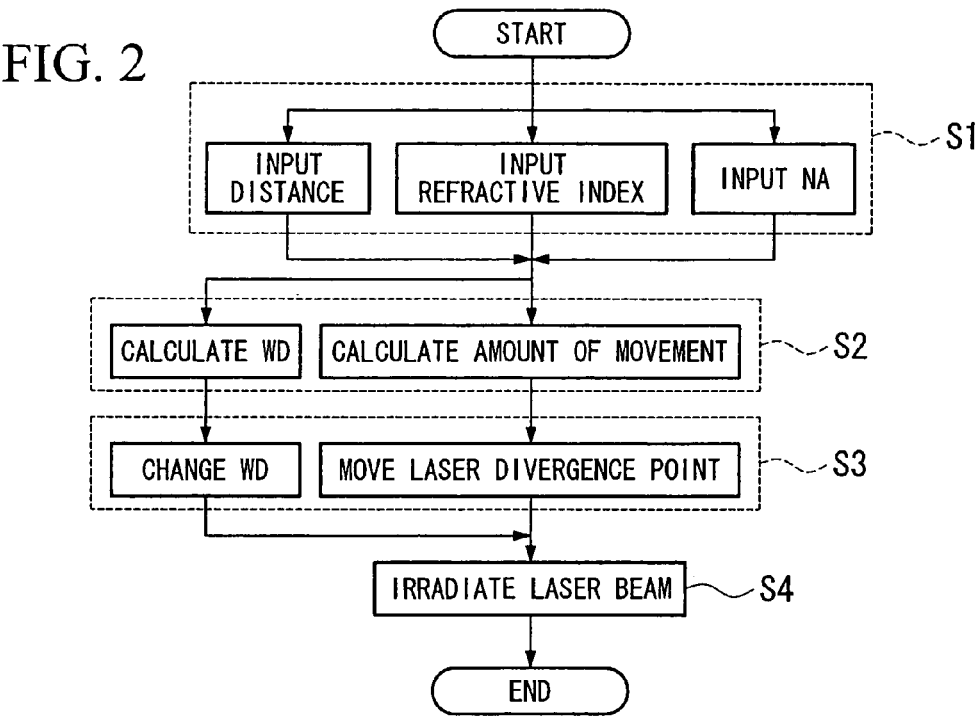
FIG. 2 is an example of a flowchart when using the same laser condensing optical system to irradiate a laser beam to positions at different depths from the surface of a wafer.

In FIG. 2, to condense the laser beam L at a position at a depth of 50 µm from the surface of the wafer A, the refractive index of the wafer A, the distance from the surface of the wafer A to the condensing position (i.e. 50 µm), and the numerical aperture (NA) of the condensing optical system 2 are input to the input unit of the controller (step S1). Based on this input data, the calculator calculates the amount of movement of the laser divergence point 3, i.e. the distance between the laser divergence point 3 and the condensing optical system 2, and the distance between the condensing optical system 2 and the surface of the wafer A, i.e. the WD (step S2). After calculation, based on the calculated results, the controller controls the laser divergence point moving unit 4 so as to move the laser beam L in the optical axis direction, thereby moving the position of the laser divergence point 3 to a predetermined position and changing the distance WD between the condensing optical system 2 and the wafer A (step S3).

After moving the laser divergence point 3 and changing the WD, the controller sends a signal to the laser beam source and makes it emit the laser beam L (step S4). The emitted laser beam L becomes divergent at the position of the laser divergence point 3, which has been moved to a predetermined position by the laser divergence point moving unit 4, and is then condensed at the position 50 µm from the surface of the wafer A by the condensing optical system 2.

At this time, since the position of the laser divergence point 3 is adjusted in accordance with the depth of 50 µm as described above, the amount of spherical aberration generated can be significantly suppressed and the laser beam L can be efficiently condensed at the position of 50 µm.

To condense the laser beam L at positions at depths of 75 µm and 100 µm from the surface of the wafer A, the refractive index of the wafer A, the distance from the wafer A to the condensing position (70 µm and 100 µm), and the NA of the condensing optical system 2 are input to the input unit in the same manner as above. After calculation by the calculator, based on the calculated results, the controller controls the laser divergence point moving unit 4 so as to move it in the optical axis direction of the laser beam L, thereby moving the position of the laser divergence point 3 to predetermined positions as shown in FIGS. 1B and 1C and changing the WD. Thereafter, the laser beam L is emitted and the condensing optical system 2 condenses it at positions of 75 µm and 100 µm from the surface of the wafer A.

Since the position of the laser divergence point 6 is adjusted in accordance with the depths of 75 µm and 100 µm in the same manner as described above, that the amount of spherical aberration generated at those depths can be significantly suppressed and the laser beam L can be efficiently condensed at the positions of 75 µm and 100 µm.

When the laser beam L is condensed in the wafer A, the energy condenses at one point (condensing point) and causes a crack. In particular, since the laser beam L can be condensed at positions of different depths (50 µm, 75 µm, and 100 µm) while significantly suppressing spherical aberration, it is possible to accurately cause cracks at desired positions.

By executing laser processing by horizontally scanning the stage while the laser beam L is condensed at a predetermined depth, adjacent cracks can be linked such as to cut the wafer A to a given size, e.g. a chip shape.

As described above according to the laser processing device and the laser condensing optical system of this embodiment, when condensing the laser beam L at different depths from the surface of the wafer A 3a (50 µm, 75 µm, and 100 µm), the laser divergence point moving unit 4 moves the laser divergence point 3 along the optical axis in accordance with the refractive index of the wafer A and the distance from the surface of the wafer A to each condensing position. This significantly suppresses the amount of spherical aberration generated and efficiently condenses the laser beam L in an ideal state at each depth. By scanning at each depth, laser processing can be performed more accurately, making cutting more precise.

In particular, since this configuration moves only the laser divergence point 3, spherical aberration can be corrected easily without consuming time in the conventional manner. Since there is no need for a special optical system such as an objective lens with a correction ring, the configuration can be simplified while reducing the cost. Moreover, since only the laser divergence point 3 is moved, continuous variability is easy and the configuration is easily adapted for automation.

While in the first embodiment, the refractive index of the wafer A, the distance from the surface of the wafer A to the condensing position, and the NA of the condensing optical system 2 are input to the input unit in order to calculate the position of the laser divergence point 3, this invention is not limited to this. For example, in addition to these input data, it is acceptable to input wavefront data measured from the condensing optical system 2 beforehand and calculate the position of the laser divergence point 3 based on this data.

Figure 3:
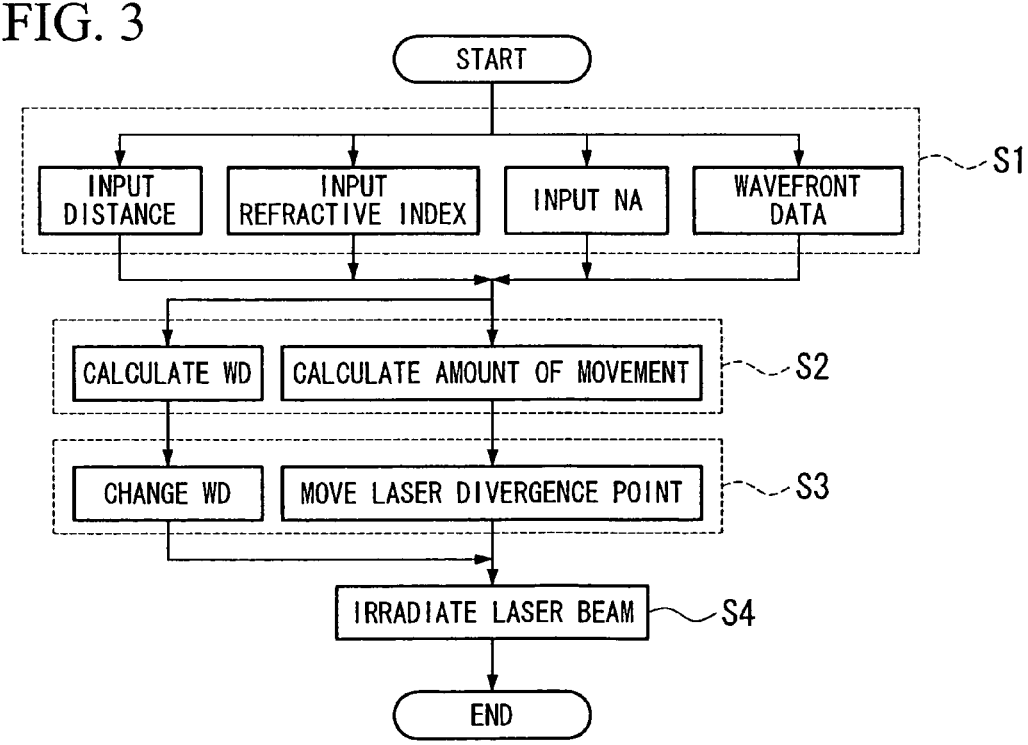
FIG. 3 is an example of a flowchart when using the same laser condensing optical system to irradiate a laser beam after considering wavefront data of a condensing optical system.

As shown in FIG. 3, when inputting the various data to the input unit (step S1 above), the refractive index of the wafer A, the distance from the surface of the wafer A to the condensing position, the NA of the condensing optical system 2, and wavefront data of the condensing optical system 4, are input.

This enables spherical aberration to be corrected with high precision and enhances the condensing performance of the laser beam L.

Wavefront data of the condensing optical system 2 may consist of wavefront data of an objective lens which forms part of the condensing optical system 2 or wavefront data of the entire condensing optical system 2.

Subsequently, a condensing optical system according to a second embodiment of this invention will be explained with reference to FIGS. 4 and 5. In the second embodiment, constituent elements which are the same as those in the first embodiment are represented by the same reference codes and are not repetitiously explained.

The second embodiment differs from the first embodiment in that while in the first embodiment, only the stage is moved during scanning, in the second embodiment, scanning is performed while maintaining a constant distance between the condensing optical system 2 and the surface of the wafer A.

Figure 4:
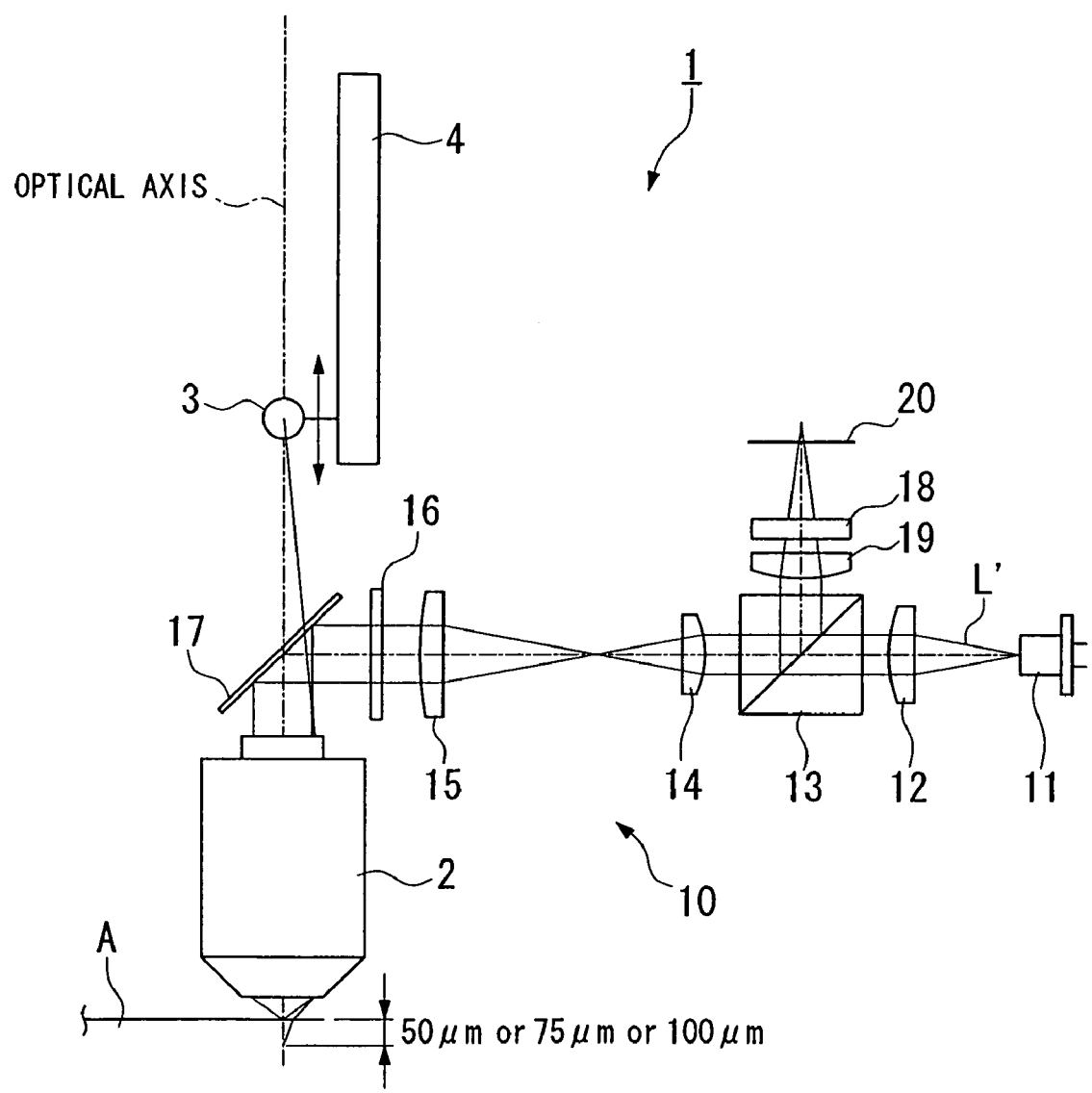
FIG. 4 is a diagram of the configuration of a laser condensing optical system according to a second embodiment of this invention.
Figure 5:
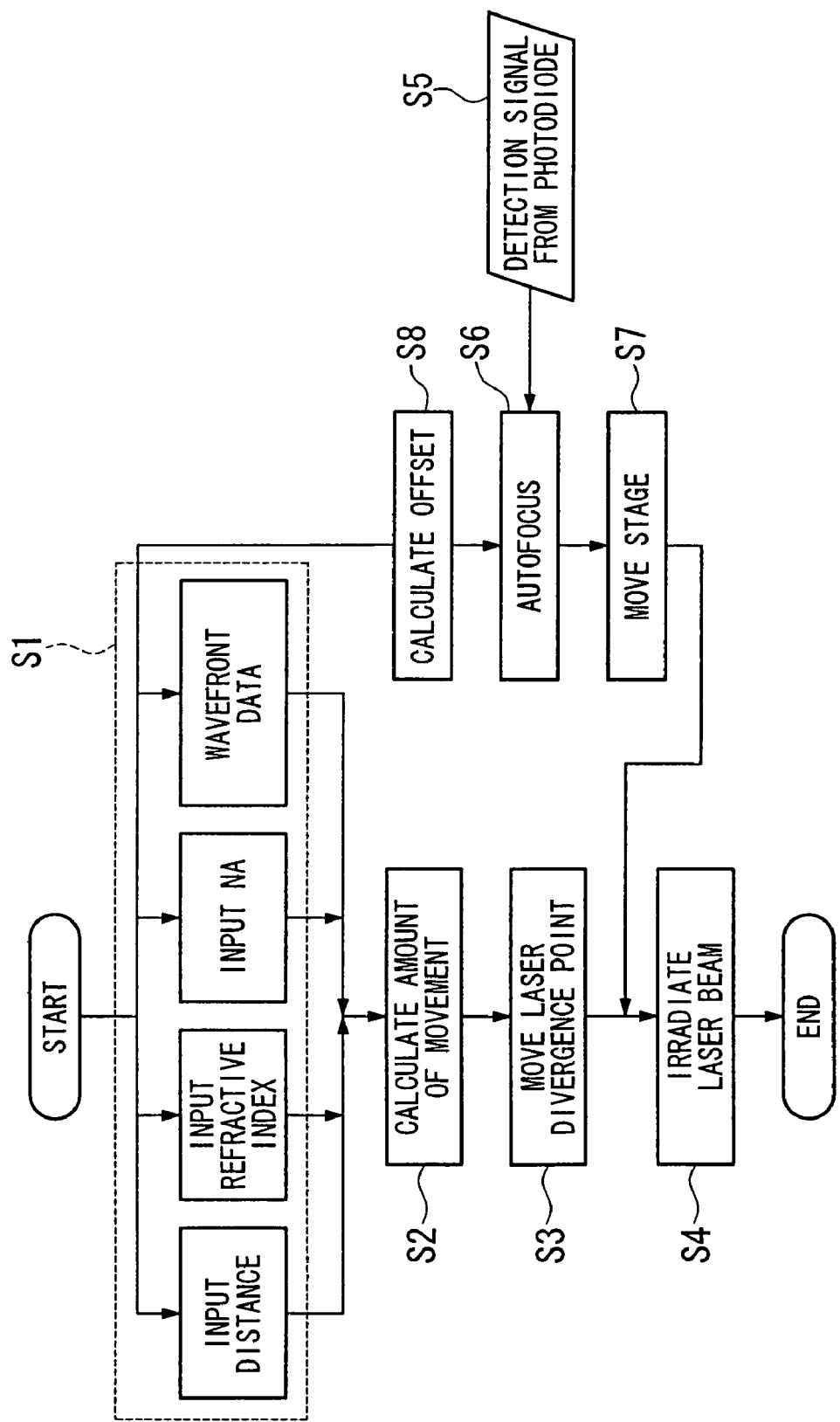
FIG. 5 is an example of a flowchart when using the same laser condensing optical system to irradiate a laser beam to positions at different depths from the surface of a wafer.

As shown in FIG. 4, the condensing optical system 2 of this embodiment includes an observation optical system 10 which is provided in coordination with the condensing optical system 2 and maintains a constant distance between a bottom face of the condensing optical system 2 and the surface of the wafer A. The observation optical system 10 includes an autofocus mechanism.

The observation optical system 10 includes a beam source 11 which emits a linearly polarized semiconductor laser beam L', a first lens 12 which collimates the semiconductor laser beam L' emitted from the beam source 11 to a parallel state, a polarizing beam splitter 13 arranged adjacent to the first lens 12, a second lens 14 which converges the semiconductor laser beam L' transmitted through the polarizing beam splitter 13, a third lens 15 which again collimates the semiconductor laser beam L' converged by the second lens 14 to a parallel state, a quarter wavelength plate 16 which converts the linearly polarized light of the semiconductor laser beam L' transmitted through the third lens 15 to circularly polarized light, a dichroic mirror 17 which reflects the semiconductor laser beam L' transmitted through the quarter wavelength plate 16 such that the direction of its optical axis is changed by 90 degrees and the light is made incident upon the condensing optical system 2, a fourth lens 19 which makes light returning from the condensing optical system 2 after being again transmitted through the quarter wavelength plate 16 and reflected by the polarizing beam splitter 13 incident on a cylindrical lens 18, and a photodiode 20 which is provided at the rear side of the cylindrical lens 18.

The dichroic mirror 17 is set such that it reflects the semiconductor laser beam L' and transmits light at other wavelengths, e.g. the laser beam L emitted from the laser beam source.

Of the linearly polarized light, for example, the polarizing beam splitter 13 transmits the linearly polarized light of a vibration component P which is parallel to the incidence face, and reflects light of a vibration component S which is perpendicular to the incidence face. The controller controls the stage using feedback based on a detection signal such as a focusing error signal received from the photodiode 20, and moves the stage in a vertical direction (optical axis direction). That is, it functions as an autofocus. Consequently, the semiconductor laser beam L' is always adjusted to the focal point on the surface of the wafer A.

When scanning the wafer A using the laser condensing optical system 2 of this configuration, the linearly polarized semiconductor laser beam L' is irradiated from the beam source 11. The irradiated semiconductor laser beam L' is made parallel by the first lens 12 and is then incident on the polarizing beam splitter 13. The linearly polarized vibration component P which is parallel to the incidence face is converged by the second lens 14 and then dispersed. The dispersed light is made parallel again by the third lens 15 and is incident on the quarter wavelength plate 16. At this time, the width of the parallel beam corresponds to that of the condensing optical system 2. After being transmitted through the quarter wavelength plate 16, the semiconductor laser beam L' becomes circularly polarized. It is then reflected by the dichroic mirror 17 and is incident on the condensing optical system 2. The beam incident on the condensing optical system 2 is illuminated onto the surface of the wafer A.

Subsequently, the light reflected from the surface of the wafer A is condensed by the condensing optical system 2, reflected by the dichroic mirror 17, and is made incident on the quarter wavelength plate 16, whereby it becomes the vibration component S which is perpendicular to the incidence face. This light is transmitted through the third lens 15 and the second lens 14, is made incident on the polarizing beam splitter 13, and reflected towards the fourth lens 19. After being converged by the fourth lens 19 it passes the cylindrical lens 18 and forms an image on the photodiode 20. The formed image is converted to a detection signal such as a focusing error signal and sent to the controller (step S5). The controller makes a calculation based the detection signal it receives (step S6), and moves the stage further in the vertical direction (optical axis direction) such that the focal point of the semiconductor laser beam L' matches the surface of the wafer A (step S7). That is, an image of the surface of the wafer A is formed at all times by automatic autofocusing.

Consequently, scanning can be performed while maintaining a constant distance between the condensing optical system 2 and the surface of the wafer A at all times. Therefore, even if the stage is slightly bent or if there is some error in its movement, the laser beam L can be condensed accurately at the desired depth. This makes it possible to scan the laser beam L while controlling the condensing position from the surface of the wafer A more accurately, and enables laser processing to be executed more precisely.

When changing the position where the laser beam L is condensed during scanning, scanning is performed after calculating the offset amount of the autofocus (step S8). For example, when scanning while the laser beam L condensed at a depth of 100 µm and then scanning at a depth of 50 µm, in addition to moving the laser divergence point, the WD must be changed to an ideal state, that is, set to an ideal value. When changing this WD value, the autofocus must be offset by a predetermined amount. In other words, the WD value is corrected by calculating the offset of the autofocus. After offsetting, scanning is performed at a different depth as described above.

Subsequently, a condensing optical system according to a third embodiment of this invention will be explained with reference to FIG. 6 and FIGS. 7A to 7C. In the third embodiment, constituent elements which are the same as those in the first embodiment are represented by the same reference codes and are not repetitiously explained.

The third embodiment differs from the first embodiment in that while in the first embodiment, the relative distance in the optical axis direction between the condensing optical system 2 and the surface of the wafer A (i.e. the WD) is not constant, in contrast in the third embodiment, the WD is constant.

Figure 6:
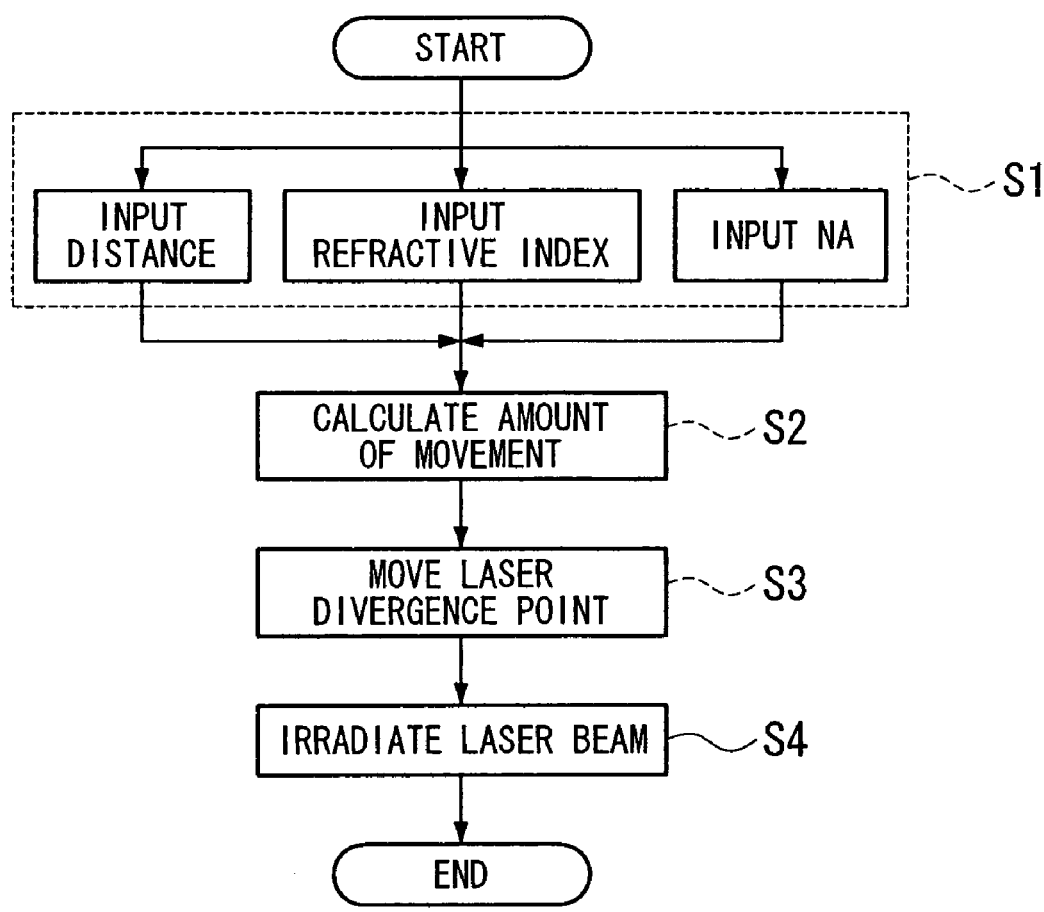
FIG. 6 is a diagram of the configuration of a laser condensing optical system according to a third embodiment of this invention, being an example of a flowchart when irradiating a laser beam to positions at different depths from the surface of a wafer.

That is, the positions of the stage and the condensing optical system 2 in the optical axis direction are set beforehand, and both are maintained in the same positions thereafter. As shown in FIG. 6, the WD value is excluded from the various data which are input to the input unit (step S1 above), i.e. the input data includes only the refractive index of the wafer A, the distance from the surface of the wafer A to the desired condensing position, and the NA of the condensing optical system 2.

Figure 7:
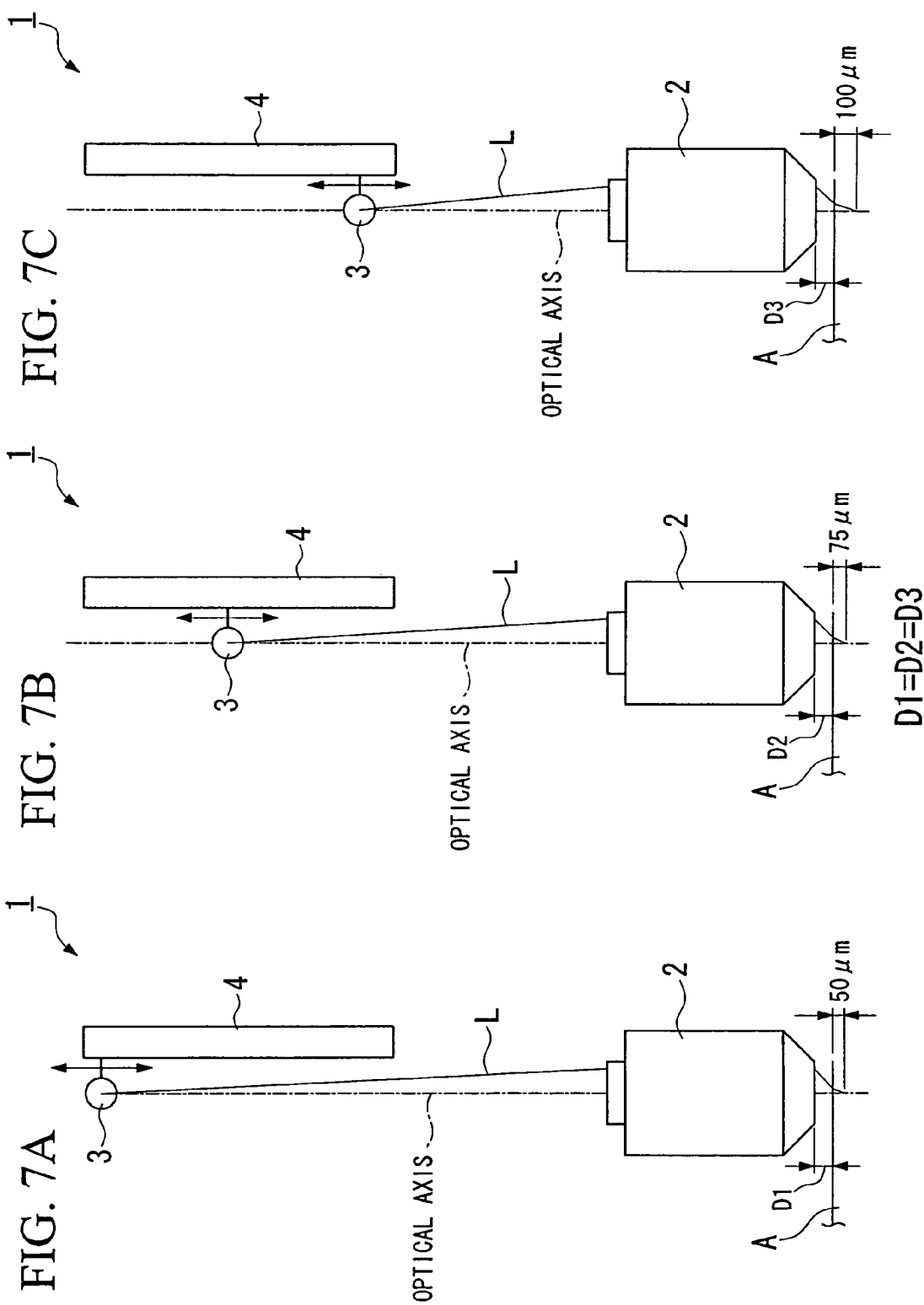
FIGS. 7A to 7C show diagrams of states when irradiating a laser beam to positions at different depths from the surface of a wafer according to the same flowchart.

As shown in FIGS. 7A to 7C, while maintaining a constant WD, the laser divergence point moving unit 4 moves only the laser divergence point 3 along the optical axis direction. This enables spherical aberration to be corrected with a simpler configuration.

Subsequently, a condensing optical system according to a fourth embodiment of this invention will be explained with reference to FIGS. 8 and 9. In the fourth embodiment, constituent elements which are the same as those in the second embodiment are represented by the same reference codes and are not repetitiously explained.

The fourth embodiment differs from the second embodiment in that while in the first embodiment, the relative distance in the optical axis direction between the condensing optical system 2 and the surface of the wafer A (i.e. the WD) is not constant, in contrast in the fourth embodiment, the WD is constant.

Figure 8:
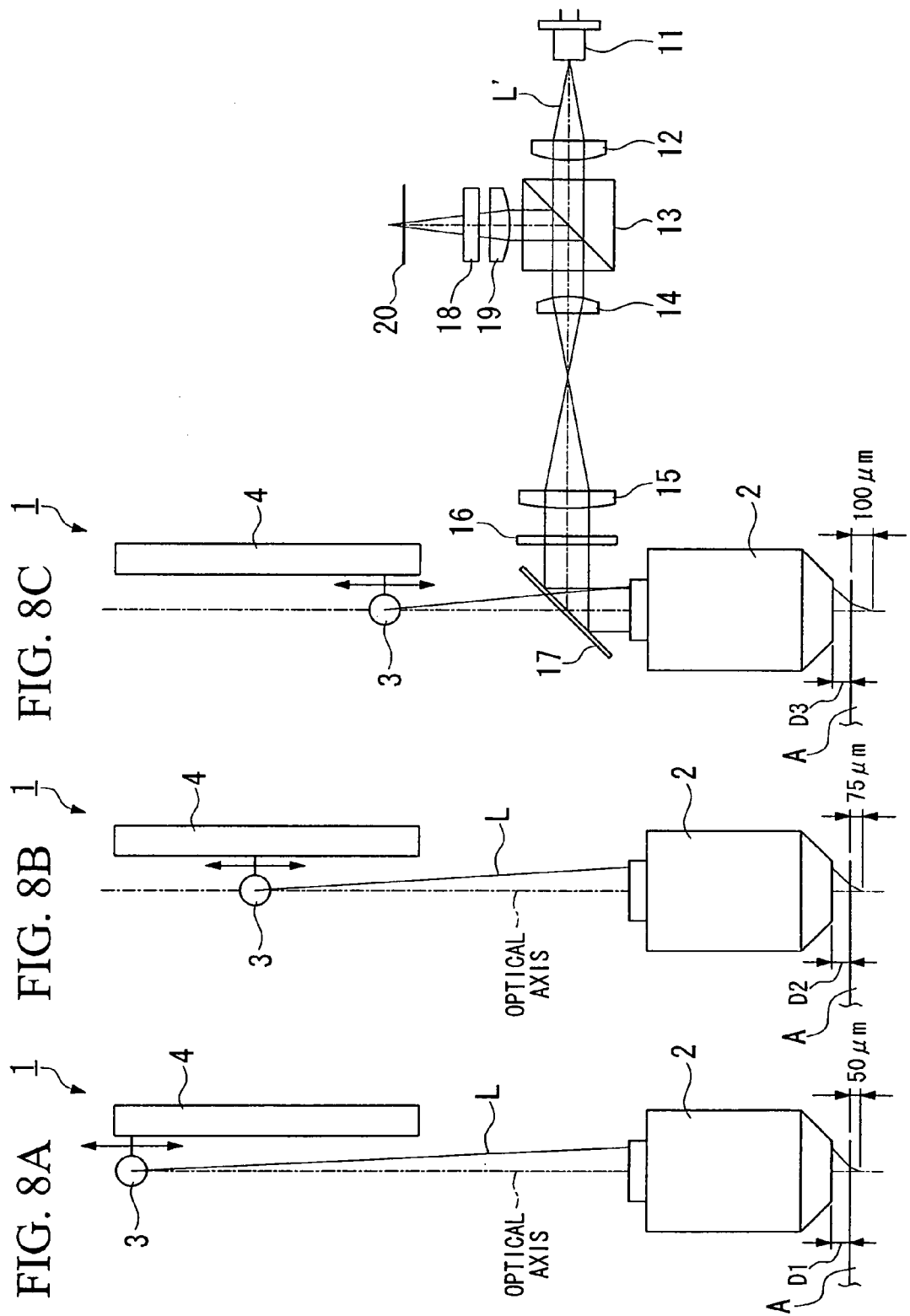
FIGS. 8A to 8C show diagrams of configurations of a laser condensing optical system according to a fourth embodiment of this invention.
Figure 9:
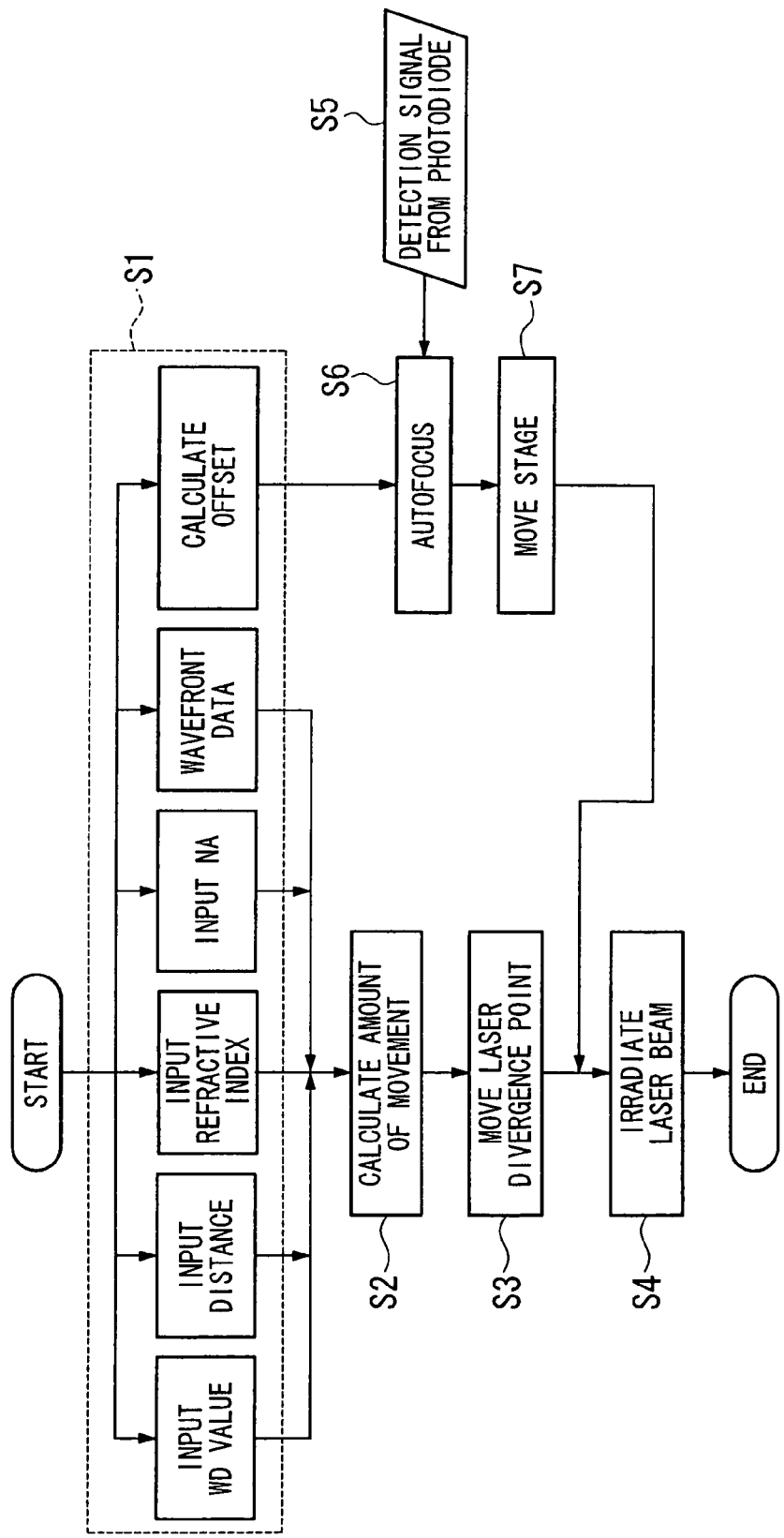
FIG. 9 is an example of a flowchart when using the same laser condensing optical system to irradiate a laser beam to positions at different depths from the surface of a wafer.

As shown in FIG. 8, the condensing optical system 2 of this embodiment can scan while offsetting with a constant WD in the same manner as the third embodiment. Therefore, as shown in FIG. 9, since there is no need to recalculate the offset of the autofocus after initially setting it, the time required for offsetting can be shortened, improving the throughput.

Furthermore, degradation in the precision of the autofocus caused by offsetting can also be reduced.

The technical scope of the present invention is not limited to the embodiments described above, and various modifications can be made without departing from the spirit of this invention.

For example, while in each of the foregoing embodiments, the laser beam is condensed in a wafer, the configuration is not limited to a wafer and the beam may be condensed in a medium. The condensing distance from the surface of the wafer is not limited to 50 µm, 75 µm, and 100 µm as described above, and may be set at will. While the relative distance between the condensing optical system and the surface of the wafer in the optical axis direction is changed by moving the stage, the invention is not limited to this configuration. For example, the relative distance could be changed by using a piezoelectric element or the like to move the condensing optical system.

While the controller is described as controlling the laser divergence point moving unit automatically, the position of the laser divergence point can be changed by moving the laser divergence point moving unit based on a calculation result obtained by the controller.

The observation optical system described in the third embodiment is merely one example, and, provided that the distance from the bottom face of the condensing optical system to the surface of the wafer can be maintained, any combination of optical systems such as lenses is acceptable.

Hereinafter, a laser processing optical system according to a fifth embodiment of this invention will be explained with reference to FIGS. 10 and 11.

Figure 10:
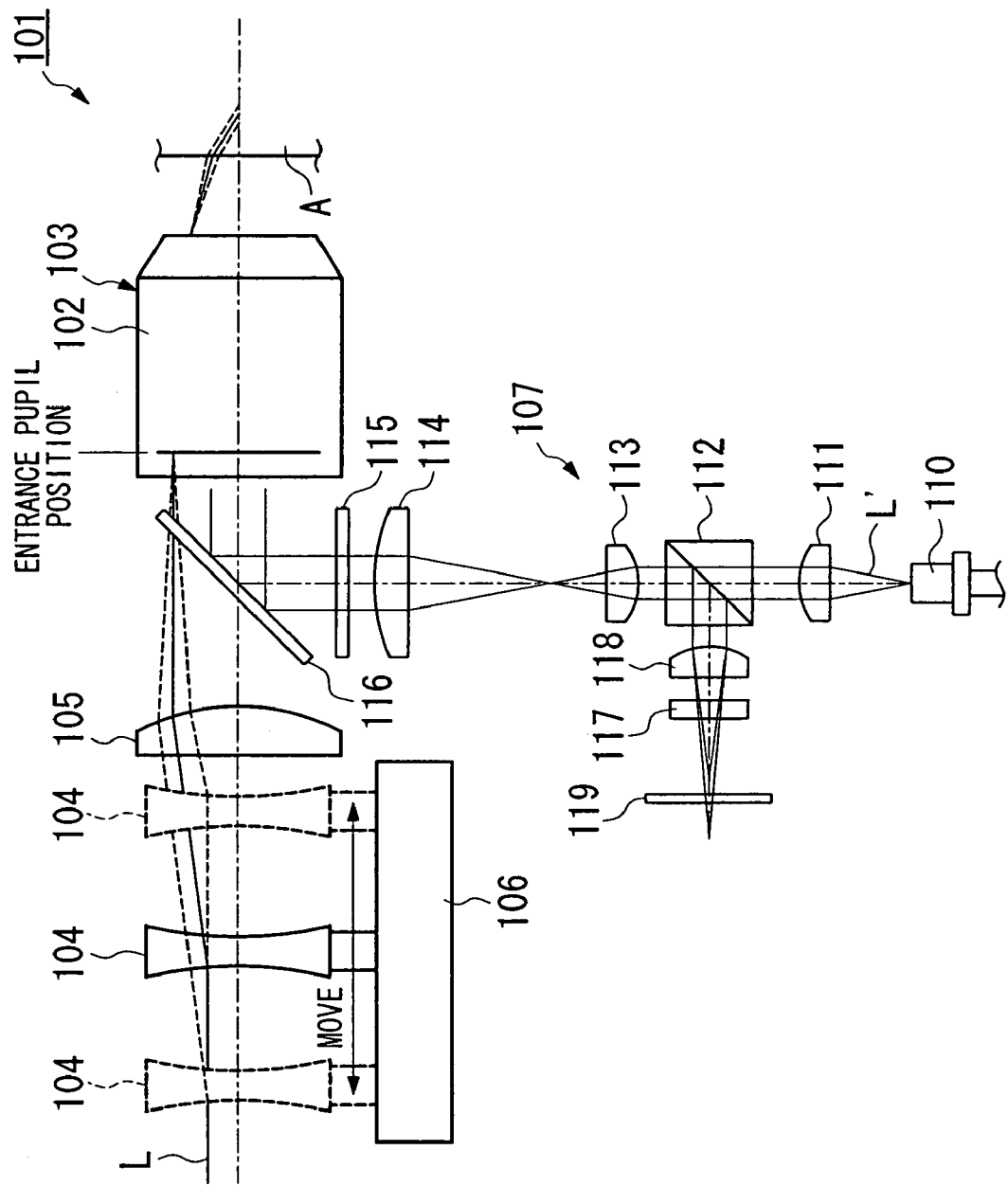
FIG. 10 is a diagram of the configuration of a laser processing device according to a fifth embodiment of this invention.

As shown in FIG. 10, a laser processing device 101 of this embodiment includes an unillustrated laser beam source which emits a laser beam L, a collimating unit consisting of an unillustrated lens and the like which collimates the laser beam L emitted from the laser beam source to parallel rays, a condensing optical system 103 including an objective lens 102 which condenses the parallel rays of the beam L in a medium, first lenses (first lens group) 104 which are arranged in the parallel rays between the collimating unit and the objective lens 102 and can be moved along the optical axis direction of the parallel rays, a second lens (second lens group) 105 which is secured in the parallel rays between the first lens group 104 and the objective lens 102, a moving unit 106 which moves the first lens group 104 in accordance with the refractive index of the wafer (medium) A where the laser beam L is to be condensed and the distance from the surface of the wafer A condensing position, and an observation optical system 107 which is provided in coordination with the condensing optical system 103 and maintains a constant distance from the bottom face of the objective lens 102 to the surface of the wafer A.

Incidentally, the wafer A is mounted on an unillustrated stage which can be moved in the XY direction.

The first lens 104 consists of a double-concave lens secured to an unillustrated lens frame. The moving unit 106 is connected to the lens frame and can move the first lens 104 via the lens frame. The moving unit 106 is also connected to an unillustrated controller, and operates based on signals received from this controller.

The controller includes an input unit which predetermined information can be input to, and a calculator which calculates the amount of movement of the first lens 104 based on input information (input data) input to the input unit, the moving unit 106 being moved by a predetermined amount in accordance with the calculated, result. In addition to controlling the moving unit 106, the controller simultaneously controls the laser beam source to emit the beam L after moving the first lens 104.

The second lens 105 is a convex lens, with its flat face side facing the first lens 104 side, that is, its convex face side faces the objective lens 102, and is arranged such that its rear side focal point position is at least in the vicinity of the entrance pupil position of the objective lens 102.

The observation optical system 107 includes a beam source 110 which irradiates a linearly polarized semiconductor laser beam L', a first lens 111 which collimates the semiconductor laser beam L' irradiated from the beam source 110 to a parallel state, a polarizing beam splitter 112 arranged adjacent to the first lens 111, a second lens 113 which converges the semiconductor laser beam L' transmitted through the polarizing beam splitter 112, a third lens 114 which again collimates the semiconductor laser beam L' converged by the second lens 113 to a parallel state, a quarter wavelength plate 115 which converts the linearly polarized light of the semiconductor laser beam L' transmitted through the third lens 114 to circularly polarized light, a dichroic mirror 116 which reflects the semiconductor laser beam L' transmitted through the quarter wavelength plate 115 such that the direction of its optical axis is changed by 90 degrees and the light is made incident upon the objective lens 102, a fourth lens 118 which makes light returning from the objective lens 102 after being again transmitted through the quarter wavelength plate 115 and reflected by the polarizing beam splitter 112 incident on a cylindrical lens 117, and a photodiode 119 which is provided at the rear side of the cylindrical lens 117.

The dichroic mirror 116 is set such that it reflects the semiconductor laser beam L' and transmits light at other wavelengths, such as the laser beam L emitted from the laser beam source.

Of the linearly polarized light, for example, the polarizing beam splitter 112 transmits the linearly polarized light of a vibration component P which is parallel to the incidence face, and reflects light of a vibration component S which is perpendicular to the incidence face. The controller controls the stage using feedback based on a detection signal such as a focusing error signal received from the photodiode 119, and moves the stage in a vertical direction (optical axis direction). That is, it functions as an autofocus. Consequently, the semiconductor laser beam L' is always adjusted to the focal point on the surface of the wafer A.

An example in which the laser processing system 101 configured as described above is used in condensing the beam L at different depths from the surface of the wafer A will be explained.

Figure 11:
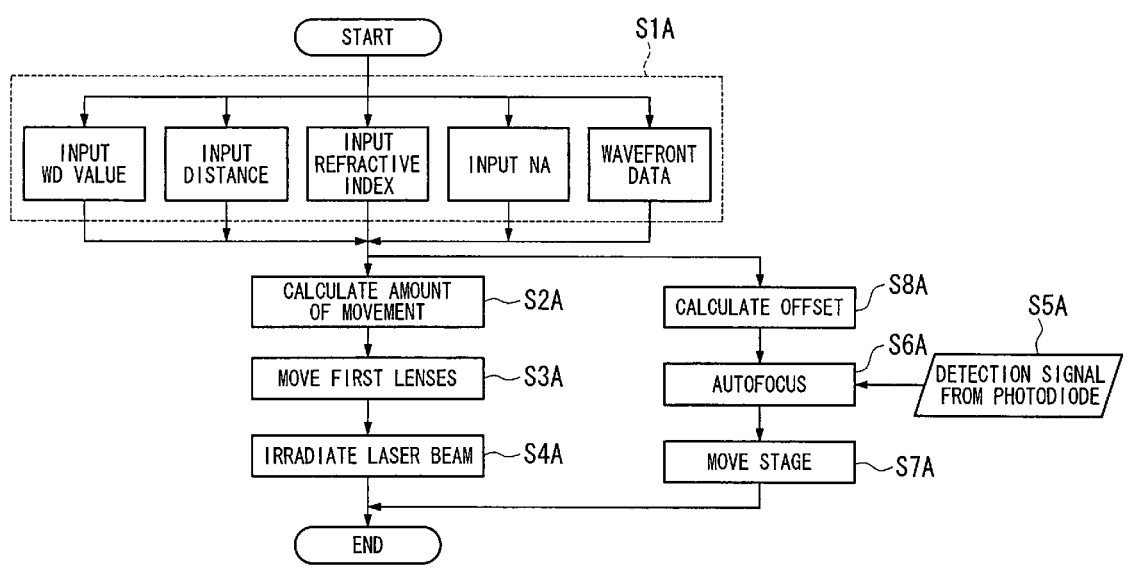
FIG. 11 is an example of a flowchart when the same laser processing device is used to condense a laser beam at a desired depth in a wafer.

As shown in FIG. 11, the refractive index of the wafer A, the distance from the surface of the wafer A to the desired condensing position (e.g. 50 μm), the NA of the objective lens 102, the distance from the objective lens 102 to the surface of the wafer A (i.e. the WD), and wavefront data relating to the objective lens 102 measured beforehand are input to the input unit of the controller (step S1A). Based on this input data, the calculator calculates the amount of movement of the first lens 104 (step S2A). After this calculation, based on the calculated result, the controller controls the moving unit 106 such as to move it in the optical axis direction of the beam L, moving the first lens 104 to a predetermined position (step S3A).

After moving the first lens 104, the controller sends a signal to the laser beam source and makes it emit the beam L (step S4). The emitted beam L is converted to a parallel state by the collimating unit, and is incident on the first lens 104. The laser beam L is refracted the by the first lens 104 and becomes divergent before being incident on the second lens 105. That is, the divergence point position of the beam L in the optical axis direction is changed by moving the first lens 104. The dispersed rays of the beam L are refracted again by the second lens 105, are made incident on the objective lens 102, and are condensed at the desired depth (50 μm) from the surface of the wafer A.

As described above, since the position of the divergent point is adjusted by moving the position of the first lens 104 in the optical axis direction in accordance with the desired depth, the amount of spherical aberration generated can be significantly suppressed and the laser beam L can be efficiently condensed at the desired position.

When condensing the beam L at a position which is different to the abovementioned condensing position (i.e. at a different depth), data including a new distance from the surface of the wafer A is input to the input unit in the same manner as described above. Based on the result calculated by the calculator, the controller operates the moving unit 106 and moves the first lens 104 along the optical axis direction to the new position. Consequently, the rays of the beam L are refracted at a position different to the one mentioned above and are dispersed before being incident upon the second lens 105. Even when the first lens 104 has moved along the optical axis, if the distance (s) from the optical axis of the rays incident on the first lens 104 is constant, the angle (q) of the rays after they pass the first lens 104 does not change (they remain parallel). The angle-unchanged (parallel) rays of the laser beam L condense at (definitely pass) one point on the rear side focal face of the second lens (second lens group). Since the rear side focal point position of the second lens 105 and the entrance pupil position of the condensing optical system 103 are arranged such that they match, the parallel rays incident on the first lens 104 always have the same diameter at the entrance pupil position of the condensing optical system 103 regardless of the position of the first lens 104, and condense without blurring in the condensing optical system 103. Since the diameter of the rays incident on the condensing optical system 103 does not change, the conventional problems of change in the intensity of the condensing position and change in, the intensity distribution in the pupil face can be suppressed.

When the laser beam L is condensed in the wafer A, the energy condenses at one point (condensing point) and causes a crack. In particular, since the laser beam L can be condensed at positions of different depths while significantly suppressing spherical aberration, it is possible to accurately cause cracks at desired positions. By executing laser processing by horizontally scanning the stage while the laser beam L is condensed at a predetermined depth, adjacent cracks can be linked such as to cut the wafer A to a given size, e.g. a chip shape.

In particular, since this embodiment includes the communication interface 107, scanning can be executed while maintaining a constant distance top and bottom punches the objective lens 102 and the surface of the wafer A.

During scanning, the beam source emits the linearly polarized semiconductor laser beam L'. The emitted semiconductor laser beam L' is collimated to a parallel state by the first lens 111 and becomes incident on the polarizing beam splitter 112. The linearly polarized vibration component P which is parallel to the incidence face is converged by the second lens 113 and dispersed. The dispersed light is made parallel again by the third lens 114 and is incident on the quarter wavelength plate 115. At this time, the width of the collimated beam corresponds to the objective lens 102. After being transmitted through the quarter wavelength plate 115, the semiconductor laser beam L' becomes circularly polarized. It is then reflected by the dichroic mirror 116 and is incident on the objective lens 102. The beam incident on the objective lens 102 is illuminated onto the surface of the wafer A.

Subsequently, the light reflected from the surface of the wafer A is condensed by the objective lens 102, reflected by the dichroic mirror 116, and is incident on the quarter wavelength plate 115, whereby it becomes the vibration component S which is perpendicular to the incidence face. This light is transmitted through the third lens 114 and the second lens 113, is incident on the polarizing beam splitter 112, and reflected towards the fourth lens 118. After being converged by the fourth lens 118 it passes the cylindrical lens 117 and forms an image on the photodiode 119. The light which forms the image is converted and sent to the controller as a detection signal such as a focusing error signal (step S5A). The controller executes a calculation based on the offset calculated by the calculator and the detection signal (step S6A), and moves the stage further in the vertical direction (optical axis direction) such that the focal point of the semiconductor laser beam L' matches the surface of the wafer A (step S7). That is, the distance between the condensing optical system 103 and the surface of the wafer A is controlled by automatic autofocusing such that it is always constant.

Consequently, the laser beam L can be scanned while always maintaining a constant distance between the objective lens 102 and the surface of the wafer A. Therefore, even if the stage is slightly bent or if there is some error in its movement, the laser beam L can be condensed accurately at the desired depth. This makes it possible to scan while controlling the condensing position from the surface of the wafer A more accurately, whereby laser processing can be performed more precisely.

When changing the position where the laser beam L is condensed during scanning, scanning is performed after calculating the offset amount of the autofocus (step S8). For example, when scanning while the laser beam L condensed at a depth of 100 μm and then scanning at a depth of 50 μm, in addition to moving the laser divergence point, the WD must be set to an ideal value. When changing this WD value, the autofocus must be offset by a predetermined amount. In other words, the WD value is corrected by calculating the offset of the autofocus. After offsetting, scanning is performed at a different depth as described above.

Figure 12:
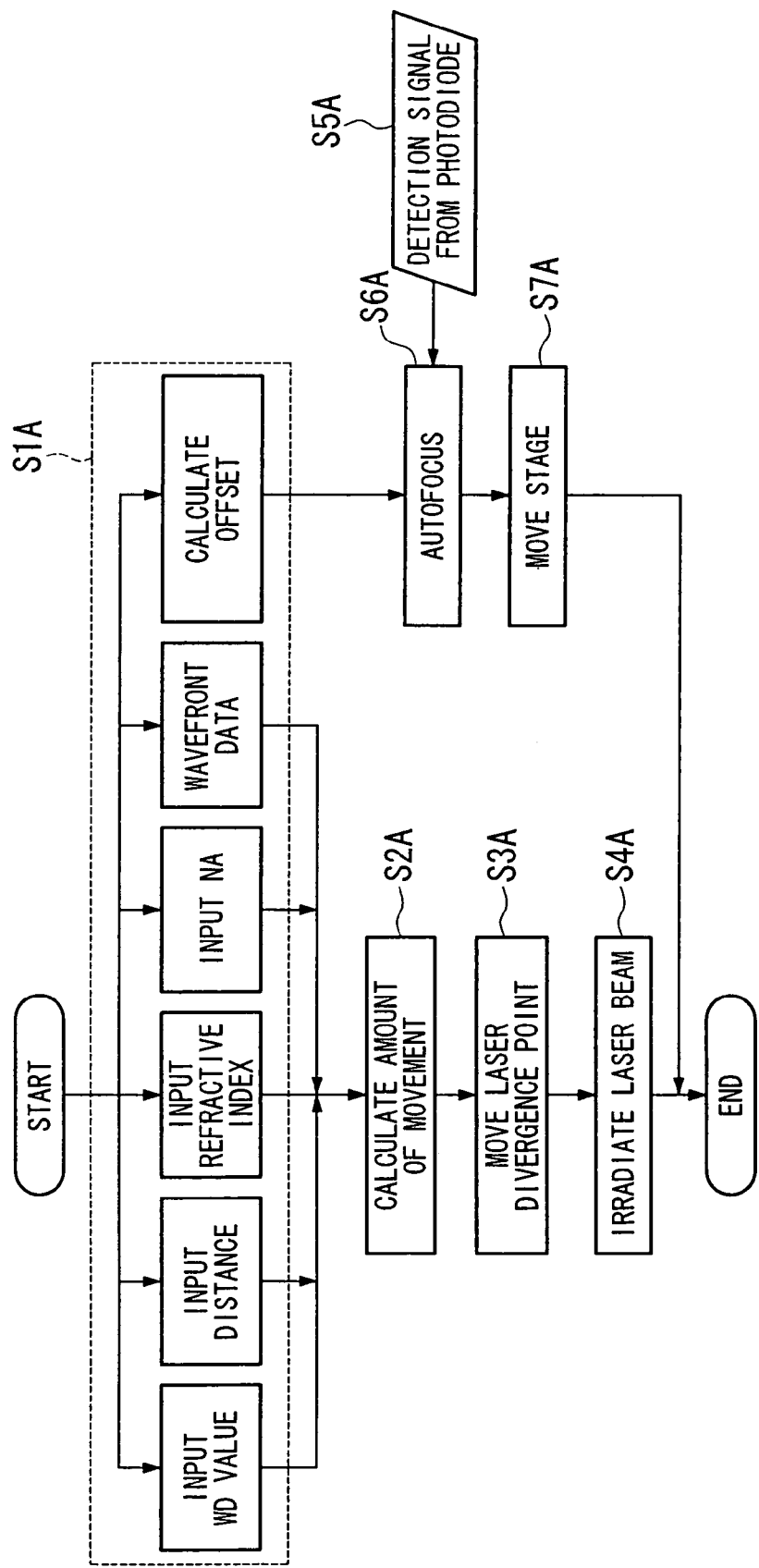
FIG. 12 is an explanatory flowchart of a laser processing device according to a sixth embodiment of this invention, being an example of a flowchart when condensing a laser beam at a desired depth in a wafer while maintaining a constant WD.

Subsequently, a laser processing device according to a sixth embodiment of this invention will be explained with reference to FIG. 12. In the sixth embodiment, constituent elements which are the same as those in the fifth embodiment are represented by the same reference codes and are not repetitiously explained.

The sixth embodiment differs from the fifth embodiment in that while in the fifth embodiment, the relative distance in the optical axis direction between the objective lens 102 and the surface of the wafer A (i.e. the WD) is not constant, in the fifth embodiment, the WD is constant.

That is, the position of the stage and the objective lens 102 in the optical axis direction is set beforehand, and they are always maintained at the same positions thereafter. Therefore, as shown in FIG. 12, since there is no need to recalculate the offset of the autofocus after initially setting it, the time required for offsetting can be shortened, improving the throughput.

Figure 13:
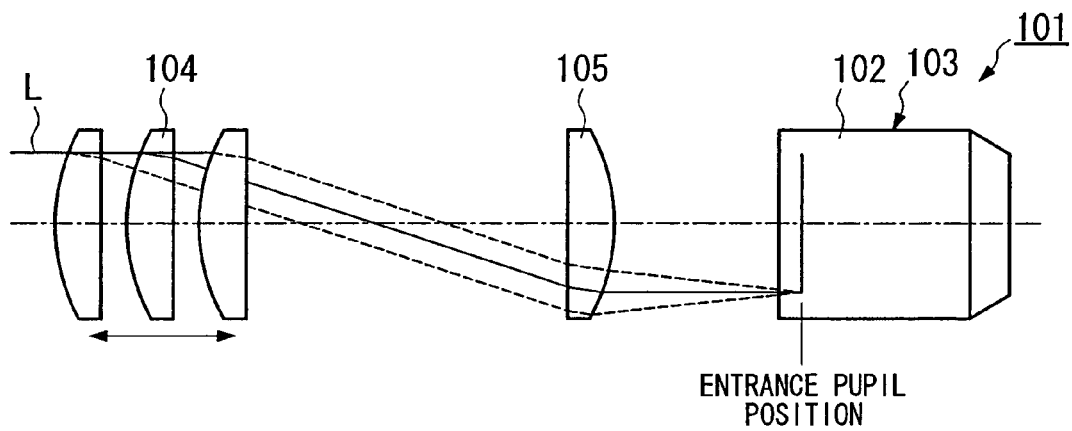
FIG. 13 is a diagram of the configuration of a laser condensing optical system according to a seventh embodiment of this invention.

Subsequently, a laser processing device according to a seventh embodiment of this invention will be explained with reference to FIG. 13. In the seventh embodiment, constituent elements which are the same as those in the fifth embodiment are represented by the same reference codes and are not repetitiously explained.

The seventh embodiment differs from the fifth embodiment in that while in the fifth embodiment, the first lens 104 includes a double-concave lens, in the laser processing device of the seventh embodiment, the first lens 104 is a convex lens and is arranged with its flat face side facing the second lens 105 side.

In this embodiment as in the fifth embodiment, regardless of the position of the first lens 104, the parallel rays of the incident beam are always refracted in the same state before being incident on the second lens 105. The laser processing device of this embodiment consequently achieves the same effects as that of the fifth embodiment.

Subsequently, an optical system according to an eighth embodiment of this invention will be explained with reference to FIG. 14. In the eighth embodiment, constituent elements which are the same as those in the seventh embodiment are represented by the same reference codes and are not repetitiously explained.

The eighth embodiment differs from the seventh embodiment in that, while in the seventh embodiment, the second lens group consists of a single concave lens (i.e. the second lens 105), in the eighth embodiment, a second lens group 120 consists of two lenses 121 and 122.

Figure 14:
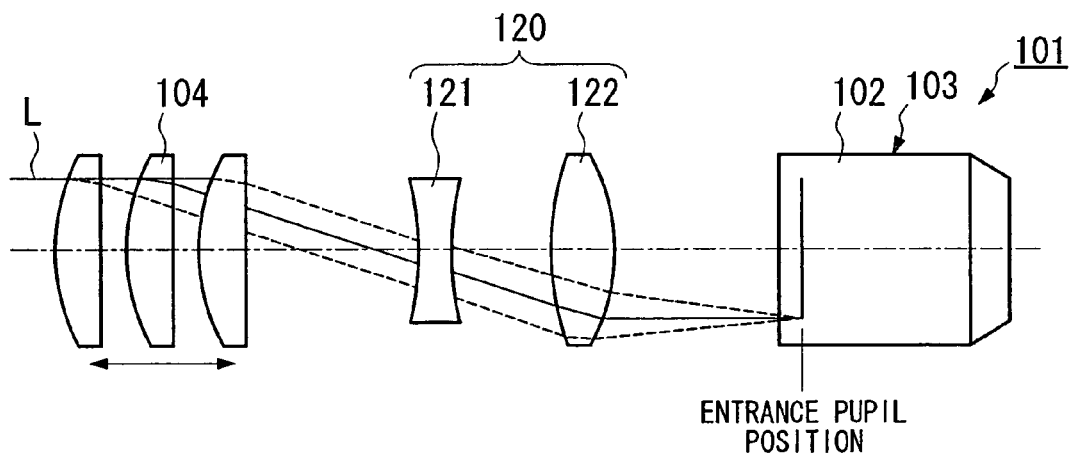
FIG. 14 is a diagram of the configuration of a laser condensing optical system according to an eighth embodiment of this invention.

As shown in FIG. 14, the second lens group 120 of this embodiment includes a double-concave lens 121 arranged on the first lens group (first lens 104) side and a double-convex lens 122 arranged adjacent to this double-concave lens 121. The rear side focal point position of the entire second lens group 120 is positioned in the vicinity of the entrance pupil position of the objective lens 102.

The laser processing device of this embodiment can obtain the same effects as that of the seventh embodiment. In addition, the interval (distance) between the second lens group 120 and the objective lens 102 can be increased, making it possible to arrange another observation system or the like between them and thereby increasing the freedom of the design.

Subsequently, an optical system according to a ninth embodiment of this invention will be explained with reference to FIG. 15. In the ninth embodiment, constituent elements which are the same as those in the fifth embodiment are represented by the same reference codes and are not repetitiously explained.

The ninth embodiment differs from the fifth embodiment in that, while in the fifth embodiment, the first lens group includes a single double-concave lens (i.e. the first lens 104), a first lens group 125 of the seventh embodiment includes two lenses 126 and 127.

Figure 15A:
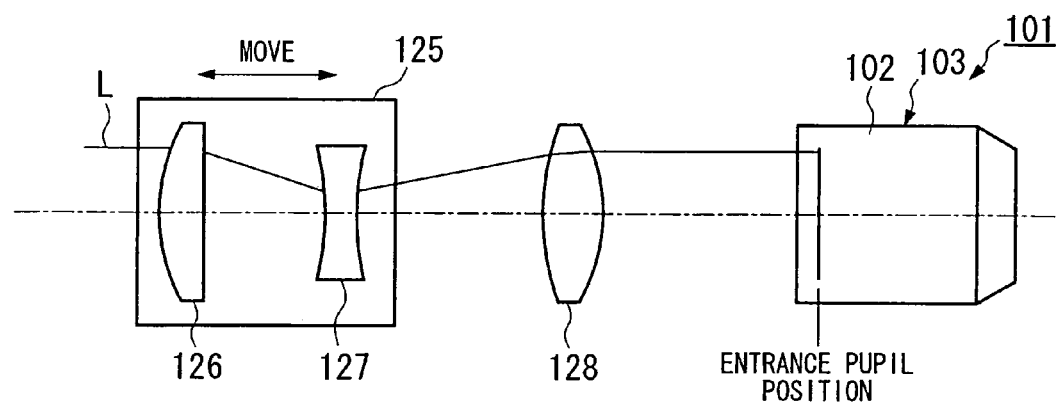
FIGS. 15A to 15C show diagrams of configurations of a laser condensing optical system according to a ninth embodiment of this invention.
Figure 15B:
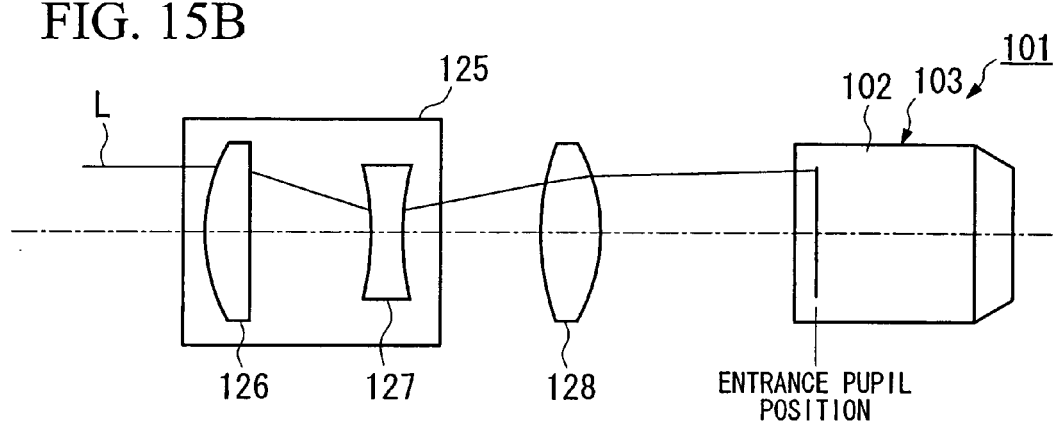
Figure 15C:
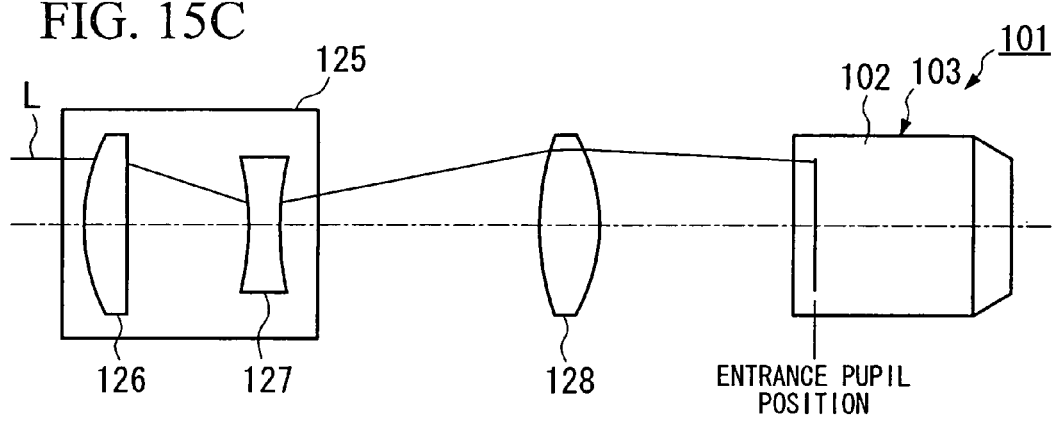

That is, as shown in FIG. 15, the first lens group 125 of this embodiment consists of a convex lens 126 arranged with its convex part facing the laser beam source and the collimating unit side, and a double-concave lens 127 arranged adjacent to the convex lens 126. The second lens group of this embodiment consists of one double-convex lens 128.

In this embodiment as in the fifth embodiment, regardless of the position of the first lens group 125, the parallel rays of the incident beam are always refracted in the same state before being incident on the second lens 128.

The laser processing device of this embodiment consequently obtains the same effects as that of the fifth embodiment.

It should be understood that the present invention is not limited to the fifth embodiment to the ninth embodiment mentioned above, and that various modifications can be made without departing from the spirit or scope of the invention. For example, the first lens group and the second lens group may consist of a single lens as in the fifth embodiment, or as more than one lens as in the seventh and eighth embodiments. The lens types are not limited to, for example, convex, concave, or double-convex, and may be freely combined and designed.

In particular, in the fifth embodiment to the ninth embodiment, the moving unit 106 should be set to move the first lens group such as to satisfy the following equation.

$$1/|f|<0.01$$

where |f| is the combined focal distance of the first lens group and the second lens group. This makes it possible to add an afocal section.

In the fifth embodiment to the ninth embodiment, the second lens group should be set such that it satisfies the following equation.

$$f2>0$$

where f2 is the focal distance of the second lens group.

The entrance pupil position of a condensing optical system is often inside the condensing optical system itself. Even if the entrance pupil position of the condensing optical system 103 is inside the optical system, the position of the rear side focal point of the second lens group can be matched with the entrance pupil position of the condensing optical system 103.

In the fifth embodiment to the ninth embodiment, the first lens group and the second lens group should be set such that they satisfy the following equations.

$$f1<0$$

$$\text{and } 1 \leq |f2/f1| \leq 5$$

where f1 is the focal distance of the first lens group and f2 is the focal distance of the second lens group.

By giving negative power (concave lens) to the first lens group and positive power (convex lens) to the second lens group, the configuration can be made more compact. Furthermore, since $1 \leq f2/f1$, the configuration of the first lens group can be simplified. This not only enables it to be made inexpensive but also suppresses performance degradation. Moreover, since $f2/f1 \leq 5$, the optical system can be configured compactly.

The settings for the first lens group and the second lens group are not limited to f1<0 and $1 \leq |f2/f1| \leq 5$ as described above. For example, in the fifth embodiment to the ninth embodiment, they may be set such as to satisfy the following equations.

$$f1>0$$

$$\text{and } 0.5 \leq |f1/f2| \leq 2$$

This enables the focal distances of both lens groups to be made positive, simplifying the configuration and achieving relay near to equimagnification.

While in the fifth embodiment to the ninth embodiment, the controller controls the moving unit automatically, the moving unit could be operated such as to move the position of the first lens group based on a calculation made by the controller.

Figure 16:
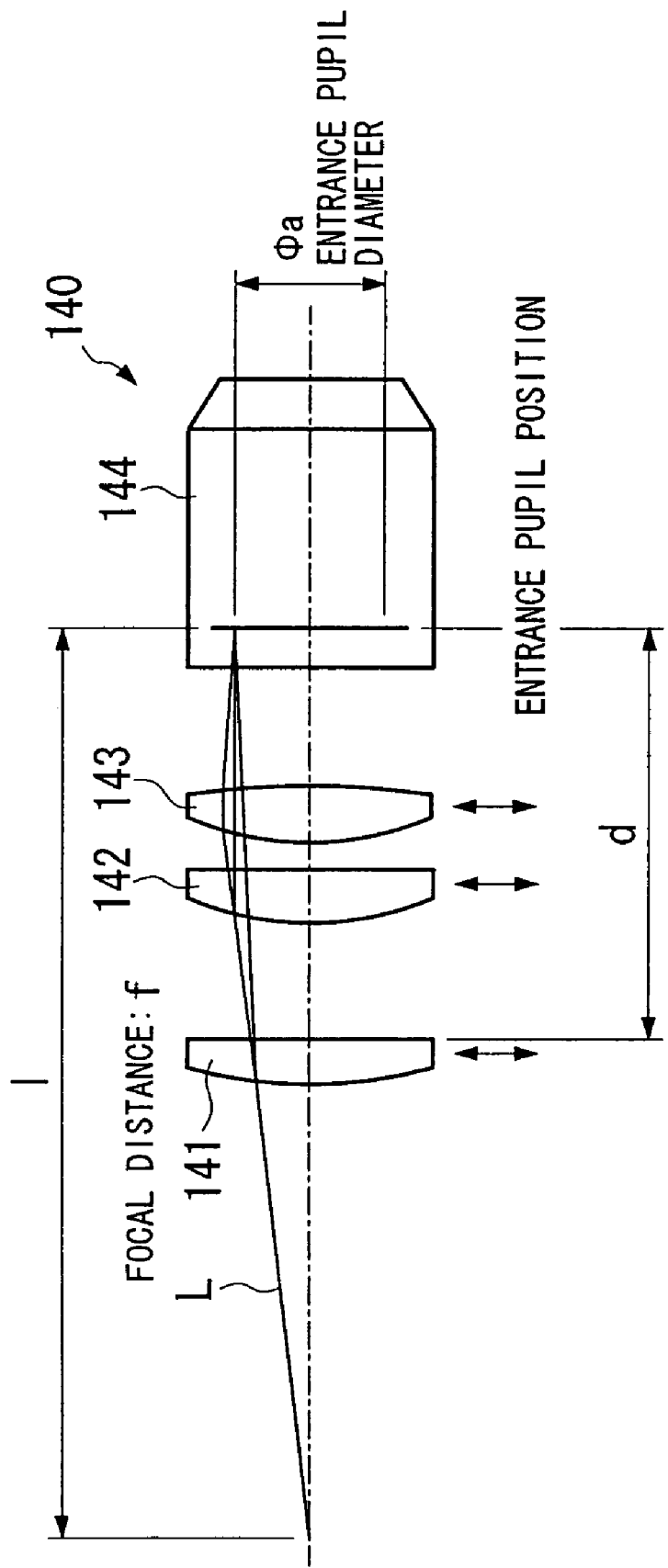
FIG. 16 is a diagram of a laser processing device in which a plurality of convex lenses are arranged in a path of divergent rays and can be inserted/removed therefrom.

The optical system of this invention may be incorporated in an aberration-correcting optical system 140 such as that shown in FIG. 16 and used to correct spherical aberration. The aberration-correcting optical system 140 condenses a laser beam L from an unillustrated beam source, and includes a plurality of lenses 141, 142, and 143 which can be exclusively inserted/removed to/from the optical path and satisfy the following equation.

$$2(d^2+l\times f-l\times d)NA=f\times a$$

where d is the distance from the entrance pupil position of the condensing optical system 103 including the objective lens 102 to a plurality of lenses 141, 142, and 143, l is the distance from the entrance pupil position of the condensing optical system 103 to the beam source position, f is the focal length of the plurality of lenses 141, 142, and 143, NA is the NA of the beam source (the NA seen from the condensing lens), and a is the entrance pupil diameter of the condensing optical system 103. The rays are divergent, and the plurality of lenses 141, 142, and 143 are convex lenses.

In the aberration-correcting optical system 140 of this configuration, even when attempting to observe (condense) parts at different depths in the wafer A using a divergent beam source, observation (condensing) can be performed while suppressing the amount of spherical aberration generated with constant intensity and constant intensity distribution in the pupil face. Furthermore, there is no need for conventional operations such as combining an expensive objective lens such as an objective lens with a correction ring and replacing glasses having different thicknesses.

Figure 17:
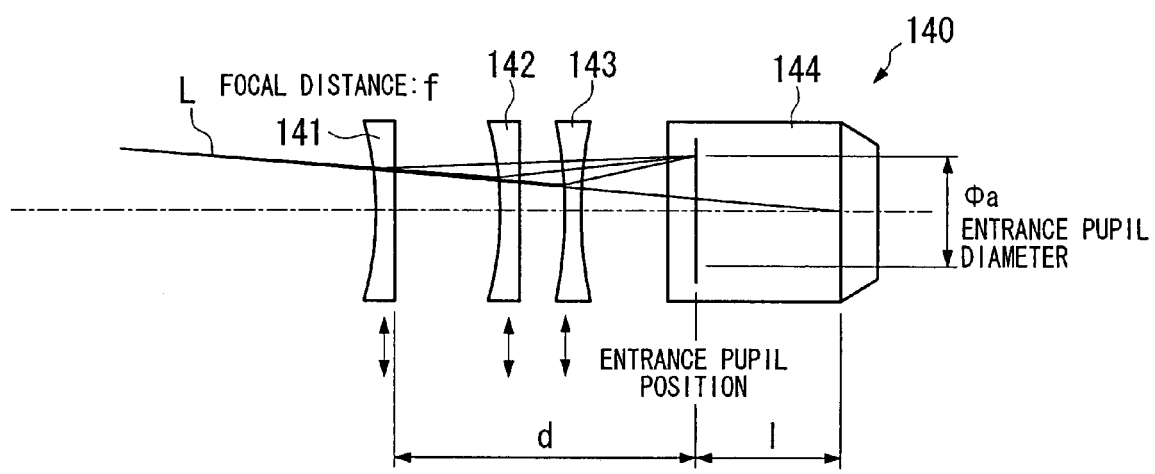
FIG. 17 is a diagram of a laser processing device in which a plurality of convex lenses are arranged in a path of convergent rays and can be inserted/removed therefrom.

While the aberration-correcting optical system 140 shown in FIG. 16 arranges the plurality of convex lenses 141, 142, and 143 in divergent rays, the plurality of lenses 141, 142, and 143 may instead be arranged in convergent rays as shown in FIG. 17. In this case, the plurality of lenses 141, 142, 143, should be concave lenses.

Figure 18:
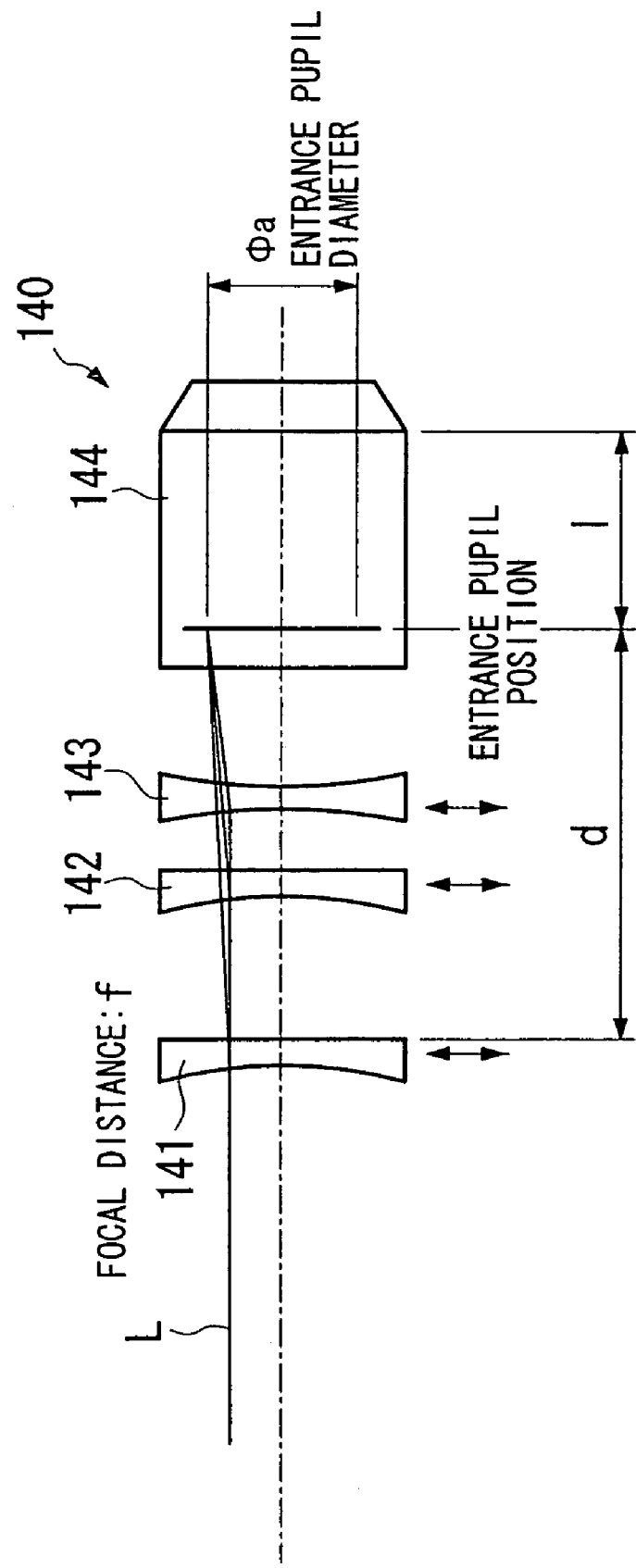
FIG. 18 is a diagram of a laser processing device in which a plurality of concave lenses are arranged in a path of parallel rays and can be inserted/removed therefrom.

The plurality of concave lenses 141, 142, and 143 may be arranged in parallel rays as shown in FIG. 18.

Figure 19:
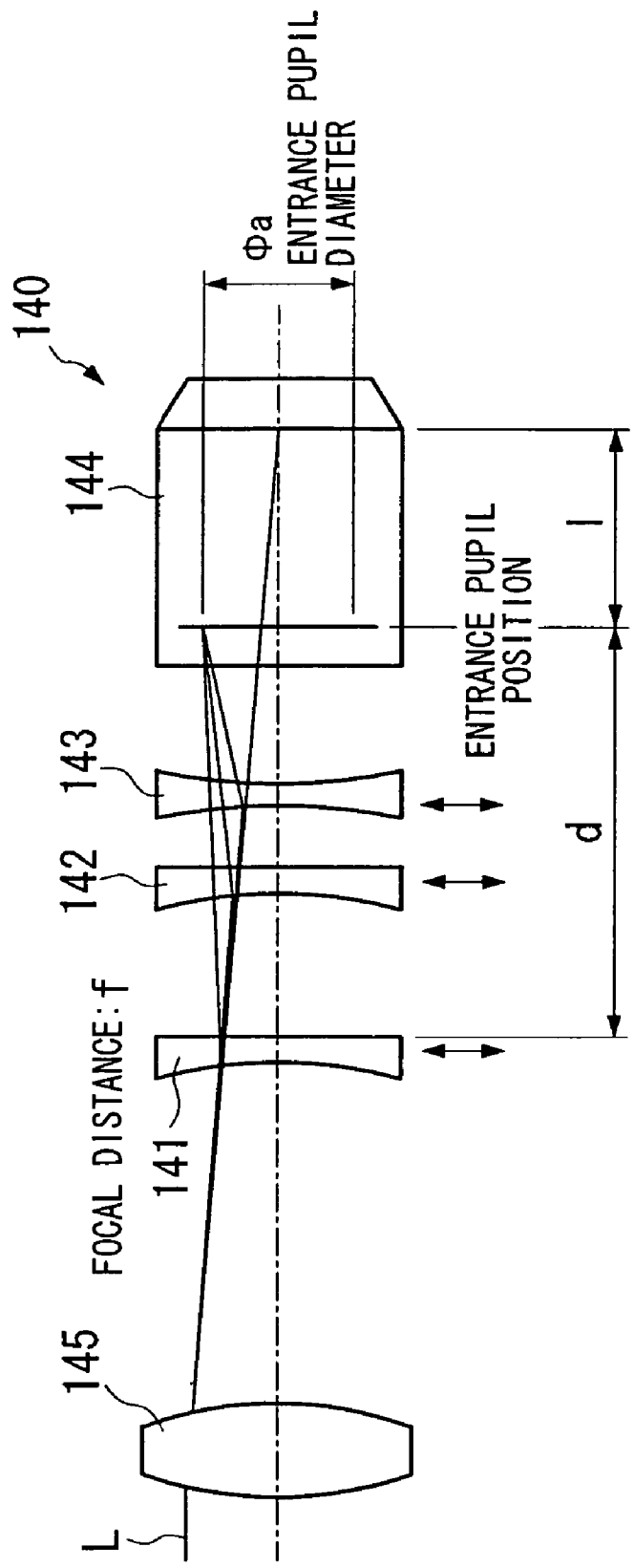
FIG. 19 is a diagram of a laser processing device in which parallel rays are converted to convergent rays by a convex lens, and a plurality of concave lenses are arranged in these convergent rays and can be inserted/removed therefrom
Figure 20:
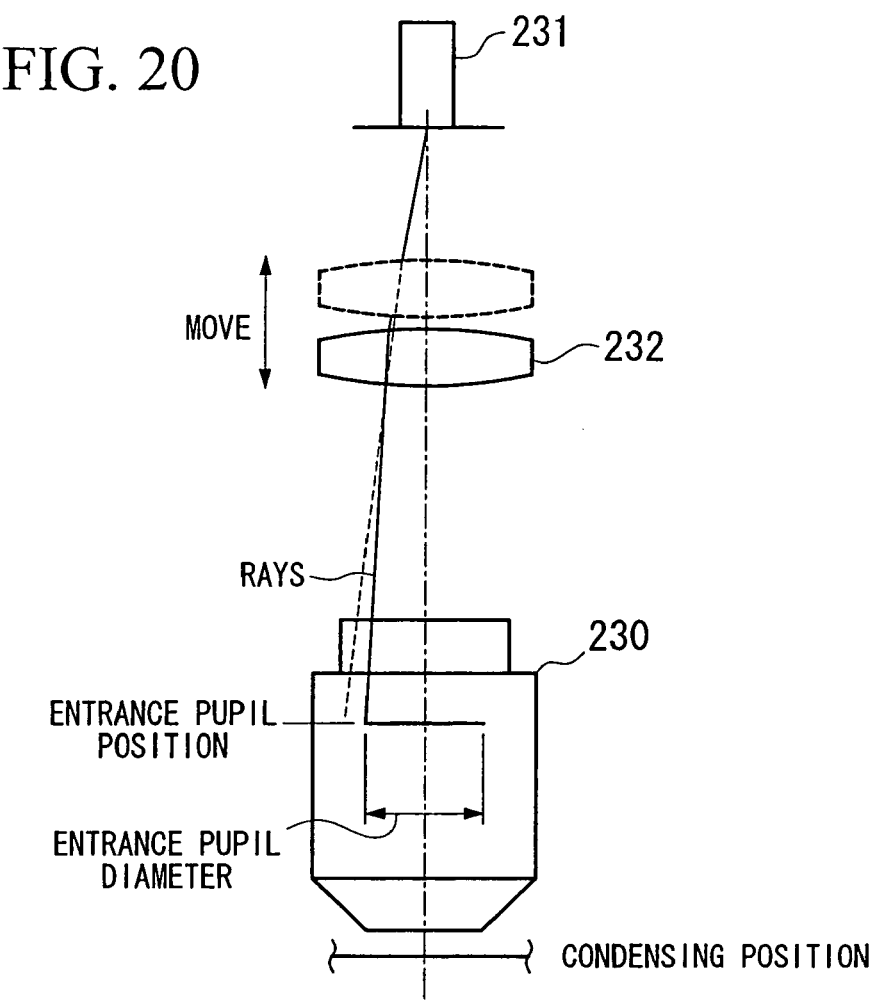
FIG. 20 is an explanatory diagram of conventional spherical aberration correction, being an example of an optical system which enables a spherical aberration correcting lens to be moved in an optical axis direction.
Figure 21:
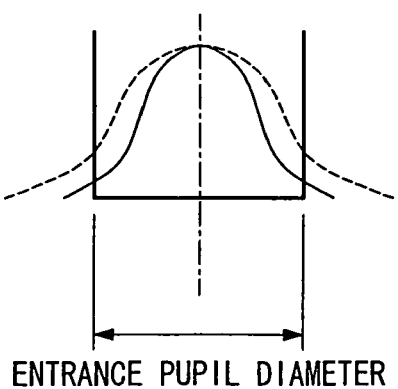
FIG. 21 is a diagram of change in light intensity at an entrance pupil position in the optical system of FIG. 20.

Moreover as shown in FIG. 19, the plurality of lenses 141, 142, and 143 may be arranged after a convex lens which temporarily converts parallel rays to divergent rays.

While in the fifth to the ninth embodiments, the laser beam is condensed in a wafer, the invention is not limited to this, and the beam may be condensed in a medium. The condensing distance from the surface of the wafer is not limited to 50 μm, 75 μm, and 100 μm as mentioned above, and may be set at will. While the relative distance between the condensing optical system and the surface of the wafer in the optical axis direction is changed by moving the stage, the invention is not limited to this configuration. For example, the relative distance could be changed by using a piezoelectric element or the like to move the objective lens.

Furthermore, the observation optical system described in the fifth embodiment is merely one example, and, provided that a constant distance can be maintained from the bottom face of the objective lens to the surface of the wafer, various optical systems such as lenses may be combined.

The present invention can be summarized as follows.

A laser condensing optical system of this invention includes a laser beam source which emits a laser beam, a condensing optical system which is arranged between the laser beam source and a medium and condenses the laser beam in the medium, and a laser divergence point moving unit which can move the position of a laser divergence point of the laser beam along an optical axis of the laser beam in accordance with the refractive index of the medium in which the laser beam is condensed and the distance from a surface of the medium to a position where the beam is condensed.

According to this laser condensing optical system, the condensing optical system can condense a laser beam emitted from the laser beam source in a medium. At this time, the laser beam is incident on the condensing optical system in a divergent state (non-parallel state). That is, it is emitted from the laser beam source in a divergent state, or emitted from the laser beam source in a parallel state and then converted by an optical system consisting of various lenses and the like to a divergent state, before being incident on the condensing optical system. The point where the laser beam changes to a divergent state is the divergence point. When condensing the laser beam, in accordance with the refractive index of the medium in which it is desired to be condensed and the distance from the surface of the medium to the desired condensing position, the laser divergence point moving unit moves the laser divergence point along the optical axis of the laser beam such that, even if the laser beam is condensed at positions at different depths in the medium, the amount of spherical aberration generated at each position can be significantly suppressed. Therefore, the laser beam can be efficiently condensed at the desired depth in the medium, and the condensing performance can be enhanced.

In particular, since only the laser divergence point is moved, spherical aberration can be corrected easily without consuming time in the conventional manner. In addition, since a special optical system such as a conventional objective lens with a correction ring is not required, the configuration can be simplified while reducing the cost. Moreover, since the laser divergence point only need be moved, continuous variability is easy and the configuration is easily adapted for automation.

The laser divergence point moving unit may set the position of the laser divergence point based on wavefront data of the condensing optical system measured beforehand.

In this case, since the laser divergence point moving unit sets the position of the laser divergence point after considering wavefront data of the condensing optical system measured beforehand, such as wavefront data of the objective lens which forms part of the condensing optical system and wavefront data of the entire condensing optical system, the condensing performance of the laser beam and the observation performance can be further enhanced.

An observation optical system may be provided in coordination with the condensing optical system, and maintains a predetermined distance from a bottom face of the condensing optical system to the surface of the medium. This observation optical system may include an autofocus detecting unit or an autofocus mechanism.

In this case, since the observation optical system can maintain a predetermined distance between the bottom face of the condensing optical system and the surface of the medium, for example, when relatively moving the condensing optical system and the medium in the horizontal direction (i.e. when scanning), scanning can be performed while maintaining the laser beam which is condensed at the desired depth in the same position. Accordingly, the laser beam can be condensed through the entire of the medium while significantly suppressing the generation of spherical aberration at different depths in a medium.

The relative distance in the optical axis direction between the condensing optical system and the surface of the medium may be constant.

In this case, even if the depth in the medium where the laser beam is desired to be condensed changes, since the relative distance in the optical axis direction between the condensing optical system and the surface of the medium (i.e., the WD) is constant, the configuration can be simplified.

It is also acceptable to use a laser processing device which includes the condensing optical system.

In this case, the laser beam can be efficiently condensed at different depths in the medium while significantly suppressing the generation of spherical aberration. Therefore, laser processing can be performed accurately and a wafer or the like can be cut with high precision.

A laser processing device according to a first aspect of this invention includes a laser beam source which emits a laser beam; a collimating unit which collimates rays of the laser beam emitted from the laser beam source to parallel rays; a condensing optical system which condenses the parallel rays of the laser beam in a medium; a first lens group which is arranged in the parallel rays between the collimating unit and the condensing optical system and can move along the optical axis direction of parallel rays, the first lens group including one or more lenses; a second lens group which is securely arranged in the parallel rays between the first lens group and the condensing optical system, and includes one or more lenses; and a moving unit which moves the first lens group in accordance with the refractive index of the medium in which the laser beam is desire to be condensed and the distance from a surface of the medium to a position where the laser beam is condensed. A rear side focal length of the second lens group is arranged at least in the vicinity of an entrance pupil position of the condensing optical system.

According to this laser processing device, the laser beam emitted from the laser beam source is converted to parallel rays by the collimating unit and refracted by the first lens group and the second lens group before becoming incident on the condensing optical system, which condenses it in the medium. At this-time, the moving unit moves the first lens group in the optical axis direction, whereby the beam source position can be moved in the optical axis direction. That is, the position of the beam source seen from the second lens group can be changed by moving the first lens group, and the actual position of the beam source seen from the condensing optical system can also be changed.

Since the first lens group is moved in accordance with the refractive index of the medium which the laser beam is condensed in and the distance from a surface of the medium to a position where the laser beam is condensed, the position of the beam source seen from the condensing optical system can be changed, and the laser beam can be condensed at the desired position (depth) while significantly suppressing the generation of spherical aberration. Therefore, laser processing can be performed accurately and a wafer or the like can be cut with high precision.

Furthermore, the second lens group is arranged such that its rear side focal length matches the entrance pupil position of the condensing optical system. Even if the first lens group moves along the optical axis, the parallel rays incident on the first lens group always have the same diameter at the entrance pupil position of the condensing optical system regardless of the position of the first lens group, and are condensed by the condensing optical system without blurring. This makes it possible to reduce change in the intensity at the condensing position and, since the intensity distribution on the entrance pupil face of the condensing optical system does not change, degradation in the condensing performance can be suppressed.

Moreover, since the position of the beam source can be changed merely by moving the first lens group, there is no need to move the condensing optical system, the stage, and the like in the optical axis direction in the conventional manner. Therefore, the configuration can be simplified and spherical aberration can be corrected easily without a time-consuming operation. In addition, since there is no need for a special optical system such as an objective lens with a correction ring, the configuration can be simplified while reducing the cost.

An observation optical system may be provided in coordination with the condensing optical system, and maintains a predetermined distance from a bottom face of the condensing optical system to the surface of the medium. This observation optical system may include an autofocus detecting unit or an autofocus mechanism.

In this case, since the observation optical system can maintain a predetermined distance between the bottom face of the condensing optical system and the surface of the medium, for example, when relatively moving the condensing optical system and the medium in the horizontal direction (i.e. when scanning), scanning can be performed while maintaining the laser beam which is condensed at the desired depth in the same position.

The relative distance in the optical axis direction between the condensing optical system and the surface of the medium may be constant.

In this case, since the relative distance in the optical axis direction between the condensing optical system and the surface of the medium (i.e. the WD) is constant, the configuration of the autofocus mechanism can be further simplified and made inexpensive.

When $|f|$ is the combined focal distance of the first lens group and the second lens group, the moving unit may move the first lens group to a position which satisfies the following equation.

$$1/|f|<0.01$$

When f2 is the focal distance of the second lens group, the second lens group may satisfy the following equation.

$$f2>0$$

When f1 is the focal distance of the first lens group and f2 is the focal distance of the second lens group, the first lens group and the second lens group may satisfy the following equations.

$$f1<0$$

and $$1 \leq |f1/f2| \leq 5$$

When f1 is the focal distance of the first lens group and f2 is the focal distance of the second lens group, the first lens group and the second lens group may satisfy the following equations.

$$f1>0$$

and $$0.5 \leq |f1/f2| \leq 2$$

A laser processing device according to a second aspect of this invention includes a laser beam source which emits a laser beam; a condensing optical system which condenses the laser beam in a medium; and a laser condensing optical system wherein, in accordance with the refractive index of the medium where the laser beam is condensed and the distance from a surface of the medium to a position where the laser beam is condensed, a plurality of lenses satisfying the following equation are exclusively inserted/removed to/from a path of divergent rays and/or convergent rays of the condensing optical system.

$$2(d^2+l \times f - l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

A laser processing device according to a third aspect of this invention includes a laser beam source which emits laser rays parallel to an optical axis; an optical system which condenses the laser rays in a medium; and a laser condensing optical system wherein, in accordance with the refractive index of the medium where the laser beam is condensed and the distance from a surface of the medium to a position where the laser beam is condensed, a plurality of lenses satisfying the following equation are exclusively inserted/removed to/from the laser rays.

$$b(f-d)/f = a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

[Advantageous Effects of the Invention]

According to the laser condensing optical system of the present invention, a laser divergence point moving unit moves a laser divergence point along the optical axis of a laser beam in accordance with the refractive index of a medium where the beam is desired to be condensed and the distance from the surface of the medium to the condensing position, thereby enabling the amount of spherical aberration generated at positions of different depths in the medium to be significantly suppressed. Therefore, the laser beam can be efficiently condensed at a desired depth in the medium, and the condensing performance can be enhanced.

In particular, since only the laser divergence point is moved, spherical aberration can be corrected easily without consuming time in the conventional manner. In addition, since a special optical system is not required, the configuration can be simplified while reducing the cost.

According to a laser processing device including the laser condensing optical system, a laser beam can be efficiently condensed at different depths in a medium while significantly suppressing the generation of spherical aberration, enabling laser processing to be performed accurately.

According to the laser processing devices of the first aspect to the third aspect of this invention, a first lens group is moved in accordance with the refractive index of a medium where the beam is desired to be condensed and the distance from the surface of the medium to a position where the beam is desired to be condensed, thereby moving the position of the laser beam incident on a second lens group, that is, the position of the beam source seen from the condensing optical system. This enables the laser beam to be condensed at the desired (position) depth while significantly suppressing the amount of spherical aberration generated. Therefore, laser processing can be performed with high precision.

Furthermore, since the rear side focal point position of the second lens group matches the entrance pupil position of the condensing optical system, the diameter of the rays incident on the entrance pupil of the condensing optical system does not change. This keeps the intensity of the incident light and the intensity distribution within the pupil face constant, suppressing change in the condensing performance.

Since the position of the beam source can be changed by moving only the first lens group, the configuration can be simplified and spherical aberration can be corrected easily and without a time-consuming operation.

The present invention also includes the following.

[Note 1]

A laser processing device including:

a laser beam source which emits a laser beam;

a collimating unit which collimates rays of the laser beam emitted from the laser beam source to parallel rays;

a condensing optical system which condenses the parallel rays in a medium;

a first lens group which is arranged in the parallel rays between the collimating unit and the condensing optical system and can move along the optical axis direction of the parallel rays, the first lens group including one or more lenses;

a second lens group which is securely arranged in the parallel rays between the first lens group and the condensing optical system, and includes one or more lenses; and a moving unit which moves the first lens group in accordance with the refractive index of the medium where the laser beam is condensed and the distance from a surface of the medium to the condensing position where the laser beam is condensed, wherein a rear side focal length of the second lens group is arranged at least in the vicinity of an entrance pupil position of the condensing optical system.

[Note 2]

The laser processing device according to Note 1, further including an observation optical system which is provided in coordination with the condensing optical system, and maintains a constant distance from a bottom face of the condensing optical system to the surface of the medium, wherein the observation optical system includes a focus detecting unit or an autofocus mechanism.

[Note 3]

The laser processing device according to Note 1 or 2, wherein the relative distance between the condensing optical system and the surface of the medium is constant.

[Note 4]

The laser processing device according to one of Notes 1 to 3, wherein when $|f|$ is the combined focal distance of the first lens group and the second lens group, the moving unit moves the first lens group to a position which satisfies the following equation.

$$1/f < 0.01$$

[Note 5]

The laser processing device according to one of Notes 1 to 4, wherein when f2 is the focal distance of the second lens group, the second lens group satisfies the following equation.

$$f2 > 0$$

[Note 6]

The laser processing device according to one of Notes 1 to 5, wherein when f1 is the focal distance of the first lens group and f2 is the focal distance of the second lens group, the first lens group and the second lens group satisfy the following equations.

$$f1 < 0$$

and $1 \leq |f1/f2| \leq 5$

[Note 7]

The laser processing device according to one of Notes 1 to 5, wherein when f1 is the focal distance of the first lens group and f2 is the focal distance of the second lens group, the first lens group and the second lens group satisfy the following equations.

$$f1 > 0$$

and $0.5 \leq |f1/f2| \leq 2$

[Note 8]

A laser processing device including:

a laser beam source which emits a laser beam;

a condensing optical system which condenses the laser beam in a medium; and a laser condensing optical system wherein, in accordance with the refractive index of the medium where the laser beam is condensed and the distance from a surface of the medium to a position where the laser beam is condensed, a plurality of lenses satisfying the following equation are exclusively inserted/removed to/from a path of divergent rays and/or convergent rays of the condensing optical system.

$$2(d^2 + l \times f - l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

[Note 9]

A laser processing device including:

a laser beam source which emits laser rays parallel to an optical axis;

an optical system which condenses the laser rays in a medium; and a laser condensing optical system wherein, in accordance with the refractive index of the medium where the laser beam is condensed and the distance from a surface of the medium to a position where the laser beam is condensed, a plurality of lenses satisfying the following equation are exclusively inserted/removed to/from the laser rays.

$$b(f-d)/f = a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

INDUSTRIAL APPLICABILITY OF THE PRESENT INVENTION

According to the laser condensing optical system of the present invention, a laser divergence point moving unit moves a laser divergence point along the optical axis of a laser beam in accordance with the refractive index of a medium where the beam is desired to be condensed and the distance from the surface of the medium to the condensing position, thereby enabling the amount of spherical aberration generated at positions of different depths in the medium to be significantly suppressed. Therefore, the laser beam can be efficiently condensed at a desired depth in the medium, and the condensing performance can be enhanced.

In particular, since only the laser divergence point is moved, generation of spherical aberration can be corrected easily without consuming time in the conventional manner. In addition, since the configuration does not require a special optical system, it can be simplified while reducing the cost.

According to the laser processing device including the abovementioned laser condensing optical system, since the laser beam can be efficiently condensed at different depths in the medium while significantly suppressing the generation of spherical aberration, laser processing can be executed accurately.

According to the first aspect to the third aspect of the laser processing device of this invention, since the position of the laser beam which is incident on the second lens group (i.e. the position of the beam source seen from the condensing optical system) can be changed by moving the first lens group in accordance with the refractive index of a medium where the beam is desired to be condensed and the distance from the surface of the medium to the condensing position, the laser beam can be condensed at the condensing position while significantly suppressing the amount of spherical aberration generated at that position. Therefore, laser processing can be executed precisely.

Furthermore, the rear side focal length of the second lens group is matched to the entrance pupil position of the condensing optical system, whereby the diameter of the rays incident on the entrance pupil of the condensing optical system does not change, enabling the intensity of the incident light and the intensity distribution in the pupil face to be kept constant. Therefore, change in the condensing performance can be suppressed.

Moreover, since the beam source position can be changed merely by moving the first lens group, the configuration can be simplified and spherical aberration can be corrected easily without consuming time.

What is claimed is:

1. A laser processing device comprising:
   a laser beam source which emits a laser beam;
   a collimating unit which collimates rays of the laser beam emitted from the laser beam source to parallel rays;
   a condensing optical system which condenses the parallel rays of the laser beam in a medium;
   a first lens group which is arranged in the parallel rays between the collimating unit and the condensing optical system and moves along the optical axis direction of parallel rays, the first lens group including one or more lenses;
   a second lens group which is securely arranged in the parallel rays between the first lens group and the condensing optical system, and includes one or more lenses; and
   a moving unit which moves the first lens group in accordance with the refractive index of the medium in which the laser beam is condensed and the distance from a surface of the medium to a position where the laser beam is condensed, wherein
   a rear side focal length of the second lens group is arranged at least in the vicinity of an entrance pupil position of the condensing optical system.

2. The laser processing device according to claim 1, further comprising
   an observation optical system which is provided in coordination with the condensing optical system and maintains a predetermined distance from a bottom face of the condensing optical system to the surface of the medium, wherein
   the observation optical system includes an autofocus detecting unit or an autofocus mechanism.

3. The laser processing device according to claim 2, wherein
   the relative distance in the optical axis direction between the condensing optical system and the surface of the medium is constant.

4. The laser processing device according to claim 1, wherein
   when |f| is the combined focal distance of the first lens group and the second lens group, the moving unit moves the first lens group to a position which satisfies the following equation $1/|f|<0.01$.

5. The laser processing device according to claim 1, wherein
   when f2 is the focal distance of the second lens group, the second lens group satisfies the following equation $f2>0$.

6. The laser processing device according to claim 1, wherein
   when f1 is the focal distance of the first lens group and f2 is the focal distance of the second lens group, the first lens group and the second lens group satisfy the following equations.

$f1<0$.

and $1 \leq |f1/f2| \leq 5$.

7. The laser processing device according to claim 1, wherein
   when f1 is the focal distance of the first lens group and f2 is the focal distance of the second lens group, the first lens group and the second lens group satisfy the following equations $f1>0$ and $0.5 \leq |f1/f2| \leq 2$.

8. A laser processing device comprising:
   a laser beam source which emits a laser beam;
   a condensing optical system which condenses the laser beam in a medium; and
   a laser condensing optical system wherein, in accordance with the refractive index of the medium where the laser beam is condensed and the distance from a surface of the medium to a position where the laser beam is condensed, a plurality of lenses satisfying the following equation are exclusively inserted/removed to/from a path of divergent rays and/or convergent rays of the condensing optical system.

$2(d^2+l \times f-l \times d)NA = f \times a$ where d is the distance from an entrance pupil position of a condensing optical system to the plurality of lenses,
   l is the distance from the entrance pupil position of the condensing optical system to the beam source position,
   f is the focal length of the plurality of lenses,
   NA is the numerical aperture of the beam source (the numerical aperture seen from a condensing lens), and
   a is the entrance pupil diameter of the condensing optical system.

9. A laser processing device comprising:

a laser beam source which emits laser rays parallel to an optical axis;

an optical system which condenses the laser rays in a medium; and a laser condensing optical system wherein, in accordance with the refractive index of the medium where the laser beam is condensed and the distance from a surface of the medium to a position where the laser beam is condensed, a plurality of lenses satisfying the following equation are exclusively inserted/removed to/from the laser rays $$b(f-d)/f=a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

10. A laser processing device comprising:

a laser beam source which emits a laser beam;

a condensing optical system which is arranged between the laser beam source and a medium and condenses the laser beam in the medium;

a laser divergence point moving unit which moves a position of a laser divergence point of the laser beam along an optical axis of the laser beam; and a controller which controls the laser divergence point moving unit, wherein the controller includes:

an input unit into which a refractive index of the medium in which the laser beam is condensed, and a distance from a surface of the medium to a position where the laser beam is condensed, are input; and a calculator which calculates an amount of movement of the laser divergence point based on the refractive index and the distance, and wherein the laser divergence point moving unit moves the laser divergence point based on the amount of movement calculated by the calculator.

11. A laser processing device comprising:

a laser beam source which emits a laser beam;

a condensing optical system which is arranged between the laser beam source and a medium and condenses the laser beam to a position inside the medium; and a laser divergence point moving unit which moves the position of a laser divergence point of the laser beam along an optical axis of the laser beam, wherein the laser divergence point moving unit sets the position of the laser divergence point in accordance with the refractive index of the medium in which the laser beam is condensed, the distance from a surface of the medium to a position where the laser beam is condensed, and wavefront data of the condensing optical system measured beforehand.

12. A laser processing device comprising:

a laser beam source which emits a laser beam;

a condensing optical system which is arranged between the laser beam source and a medium and condenses the laser beam to a position inside the medium;

a laser divergence point moving unit which moves the position of a laser divergence point of the laser beam along an optical axis of the laser beam in accordance with the refractive index of the medium in which the laser beam is condensed and the distance from a surface of the medium to a position where the beam is condensed; and an observation optical system which is provided in coordination with the condensing optical system and maintains a predetermined distance from the condensing optical system to the surface of the medium, wherein the observation optical system includes an autofocus detecting unit or an autofocus mechanism.

13. The laser processing device according to claim 12, wherein the autofocus detecting unit or the autofocus mechanism performs focusing on the surface of the medium, and offsets an auto focusing point by a predetermined amount in accordance with the position inside the medium, where the laser beam is condensed.

14. The laser processing device according to claim 12, wherein the autofocus detecting unit or the autofocus mechanism controls so as to maintain a relative distance in the optical axis between the condensing optical system and the surface of the medium, to be constant.

* * * * *